United States Patent
Bhateja et al.

(10) Patent No.: US 7,457,715 B1
(45) Date of Patent: Nov. 25, 2008

(54) ENHANCED FLEXIBLE PROCESS OPTIMIZER

(75) Inventors: Rajiv K. Bhateja, Oak Ridge, TN (US); Chander P. Bhateja, Oak Ridge, TN (US)

(73) Assignee: Ranko, LLC, Oak Ridge, TN (US)

( * ) Notice: Subject to any disclaimer, the term of this patent is extended or adjusted under 35 U.S.C. 154(b) by 334 days.

(21) Appl. No.: 11/345,410

(22) Filed: Feb. 1, 2006

Related U.S. Application Data

(63) Continuation of application No. 10/764,615, filed on Jan. 26, 2004, now Pat. No. 7,246,023.

(51) Int. Cl.
*G01R 35/00* (2006.01)

(52) U.S. Cl. .................................. 702/106; 702/179

(58) Field of Classification Search ............... 702/106, 702/179
See application file for complete search history.

(56) References Cited

U.S. PATENT DOCUMENTS

| | | |
|---|---|---|
| 4,510,565 A | 4/1985 | Dummermuth |
| 4,570,389 A | 2/1986 | Leitch et al. |
| 4,590,573 A | 5/1986 | Hahn |
| 4,855,925 A | 8/1989 | Bhateja |
| 4,876,664 A | 10/1989 | Bittorf et al. |
| 5,248,248 A | 9/1993 | Adly |
| 5,470,218 A | 11/1995 | Hillman et al. |
| 6,098,452 A | 8/2000 | Enomoto |
| 6,113,461 A * | 9/2000 | Onoda et al. ............... 451/5 |
| 6,128,547 A | 10/2000 | Tomoeda et al. |
| 6,234,869 B1 | 5/2001 | Kobayashi et al. |
| 6,362,768 B1 | 3/2002 | Younis et al. |

OTHER PUBLICATIONS

"1741 Analog Block I/O Input/Output Modules User Manual", Allen Bradley Company, 1994.

* cited by examiner

*Primary Examiner*—Bryan Bui
*Assistant Examiner*—Stephen J Cherry
(74) *Attorney, Agent, or Firm*—Luedeka, Neely & Graham, P.C.

(57) ABSTRACT

A method is provided for monitoring characteristics of grinding tools and grinding system behavior in a production grinding process. The method includes steps of acquiring sensor data indicative of a rate of material removal over one or more measurement periods during the grinding process, acquiring sensor data indicative of power consumed by the grinding tools over the measurement periods during the grinding process, and, from a material removal versus power plot, calculating a ratio of the change in the rate of material removal to that of the power consumed by the grinding tools over the measurement periods. In some embodiments, the method includes optimizing the grinding process by adjusting the feed rates and feed transition points. Additional data from vibration sensors and work form gauges may also be used in some instances for optimization and system troubleshooting.

29 Claims, 18 Drawing Sheets

ENHANCED FLEXIBLE PROCESS OPTIMIZER

This application claims priority as a continuation of U.S. patent application Ser. No. 10/764,615 filed Jan. 26, 2004, now U.S. Pat. No. 7,246,023.

FIELD

This invention pertains to an apparatus for monitoring and controlling a production process. More specifically, this invention pertains to an apparatus connected to a production machine that acquires and analyzes data about the production process and adjusts the production machine to improve the efficiency of the production process.

BACKGROUND

Most industrial processes used for production of discrete components or for continuous products involve a multitude of variables that affect the final product quality as well as the production efficiency or productivity. An example of a continuous production system is a paper mill producing rolls of paper of certain composition, thickness, and other characteristics to meet customer specifications. An example of a discrete component production system is a precision grinding machine making automotive cam shafts, crankshafts, or other components. Maximizing the product quality as well as productivity in a competitive environment requires a certain degree of control of the production system. This is generally only possible with the help of real time data of key process parameters and product quality attributes acquired using sensors installed on the production equipment. Although production equipment may possess the components needed to move the slides and spindles at numerically controlled rates or furnace controls to maintain a certain temperature, the sensors to provide the information about the system behavior are not always available and may have to be added. The availability of real time process data combined with the controllability of the production machines still requires the determination of a control strategy or methodology best suited for an effective process control under a given set of production conditions. To complicate matters further, certain conditions such as incoming stock on each part or the instantaneous sharpness of the tool may be dynamic variables and therefore are generally not known.

Some attempts have been made in the past towards fully automatic control of the process. However, this requires instrumenting the production machines to obtain real time information on the machine and spindle stiffness as well as the actual tool sharpness. Typical of the prior art are the devices of the following patents.

| U.S. Pat. No. | Inventor | Issue Date |
| --- | --- | --- |
| 4,855,925 | Bhateja | Aug. 8, 1989 |
| 4,570,389 | Leitch, et al. | Feb. 18, 1986 |
| 4,590,573 | Hahn | May 20, 1986 |
| 6,098,452 | Enomoto | Aug. 8, 2000 |
| 6,128,547 | Tomoeda, et al. | Oct. 3, 2000 |
| 6,234,869 | Kobayashi, et al. | May 22, 2001 |

Leitch, et al., describe an automatic adaptive system to maintain a constant wheel sharpness without wheel breakdown. Hahn describes a computer controlled technique for rounding up holes in a grinding taking into account the spindle deflection. The inventions of Enomoto and Tomoeda automatically control the final workpiece diameter using a measuring head during grinding. Kobayashi describes measuring the ground workpiece diameter using a gauge head to reveal any abrupt changes or lack of changes in part size during grinding.

The inventions identified above are generally directed to attempts at the automatic control of a grinding operation based upon a specific, predetermined attribute of a the workpiece. However, none of these prior art patents disclose how to optimize and control the grinding process based upon broad criteria of workpiece quality attributes and system productivity, nor do they provide the flexibility to change the optimization criteria according to the specific process or the desires of the user. Finally, the prior art control systems require instrumented machines with sensors and gauge heads and, therefore, are generally not adaptable to existing grinding machines lacking the necessary instrumentation.

SUMMARY

An apparatus for recording various parameters of a production process and analyzing the information gained from the parameters to improve the efficiency of the production process is shown and described. The flexible process optimizer combines data acquisition capabilities with data analysis tools to provide a user with the ability to visualize how the machine is behaving during the production process and what areas need improvement. The flexible process optimizer acquires data from sensors mounted on a production machine and plots the sensor data on a display allowing the user to see in detail what is really happening inside the production process. The flexible process optimizer permits the user to control fully the measurement ranges, full scales, and other features of all the sensors used to monitor the process. From the qualitative sensor data display, the user can analyze the process signatures in the time domain and the frequency domain to spot inefficiencies in the production process. By identifying the inefficiencies in the production process, the process parameters can be adjusted to reduce or eliminate the inefficiency thereby directly improving the efficiency of the production operation. In addition, the user can compute specific quantitative parameters from the process data. Analyzing these specific values helps quantify the process capability for comparison with other similar systems and to insure that the process demands do not exceed the physical limitations of the production system. Having the qualitative data and the quantitative data provides a precise measure of the production system behavior and allows the performance levels of different production operations to be compared.

BRIEF DESCRIPTION OF THE DRAWINGS

The above-mentioned features of the invention will become more clearly understood from the following detailed description of the invention read together with the drawings in which.

DETAILED DESCRIPTION

An apparatus for recording various parameters of a production process and analyzing the information gained from the parameters to improve the efficiency of the production process, or flexible process optimizer 100, is shown in the accompanying figures and described herein. The flexible process optimizer 100 combines data acquisition capabilities with data analysis tools to provide a user with the ability to visualize how the machine is behaving during the production process and what areas can be improved.

Figure 1:
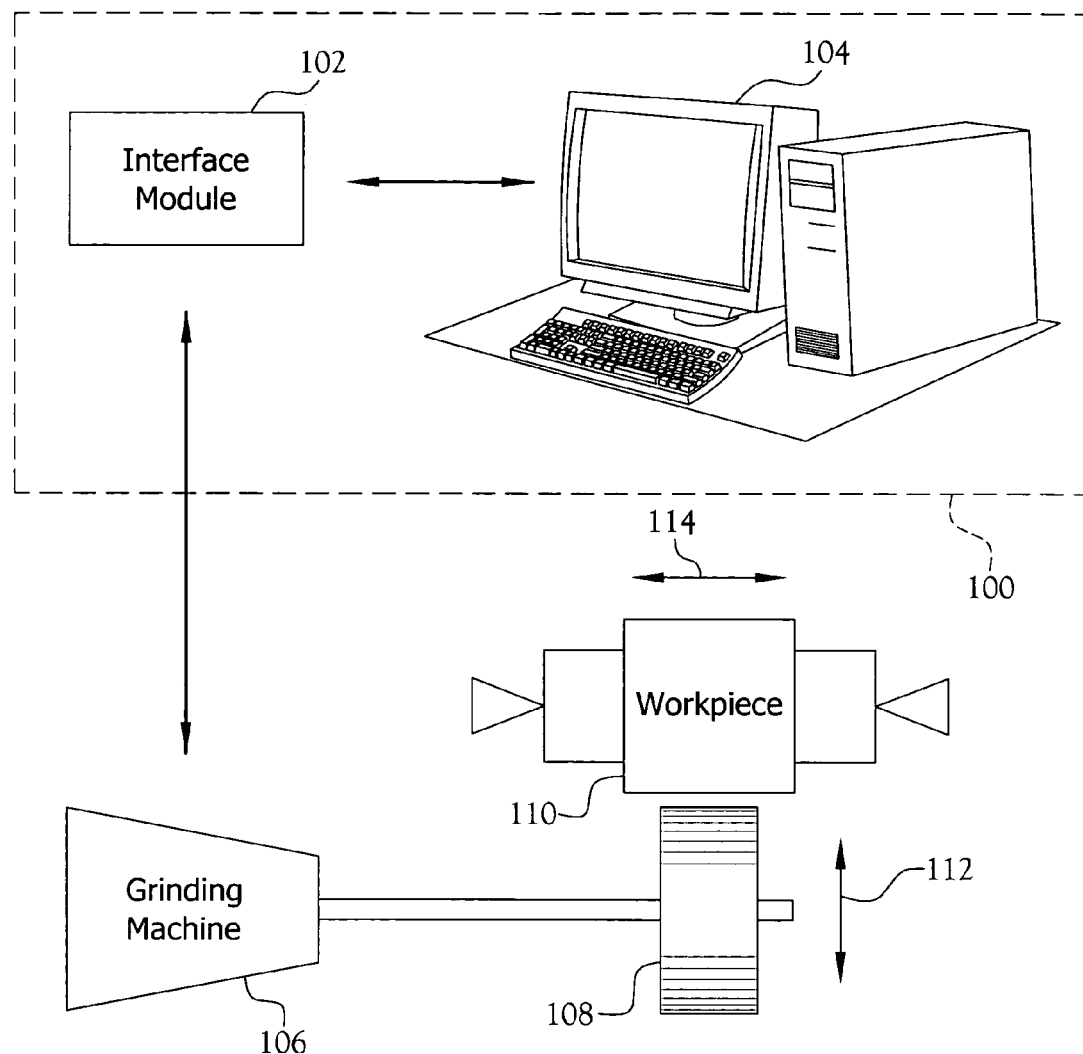
FIG. 1 illustrates a flexible process optimizer of the present invention in a production environment.

FIG. 1 illustrates the environment of the flexible process optimizer 100 of the present invention. The flexible process optimizer 100 includes two main components: an interface module 102 and a processing device running the system and application software 104. In the illustrated embodiment, the flexible process optimizer 100 is shown with the interface module 102 attached to a personal computer running the system software; however, those skilled in the art will recognize that the interface module and the processing device can be integrated into a single unit. The flexible process optimizer 100 acquires data from sensors mounted on a production machine 106 and plots the sensor data on a display, thereby allowing the user to see in detail what is happening inside the production process. The flexible process optimizer 100 permits the user to control fully the ranges, full scales, and other features of all the sensors used to monitor the process. In the illustrated embodiment, the production machine 106 is a grinding machine with a grinding wheel 108 adapted to engage and disengage a workpiece 110. The grinding wheel 108 generally moves into and out of the workpiece 110 along a line parallel to line 112. The workpiece 110 is generally moved along a line parallel to line 114 in relation to the grinding wheel 108. From the qualitative sensor data display, the user can analyze the process signatures to spot inefficiencies in the production process. By identifying the inefficiencies in the production process, the process variables can be adjusted to reduce or eliminate the inefficiency thereby directly improving the quality and productivity of the production operation. In addition, the user can compute specific quantitative values from the process data. Analyzing the specific parameter values helps quantify the process capability and the physical limitations of the production system. Having the qualitative data and the quantitative data provides a precise measure of the production system behavior and allows the performance levels of different production operations to be compared. Using this information, a balanced control strategy can be developed and implemented.

Figure 2:
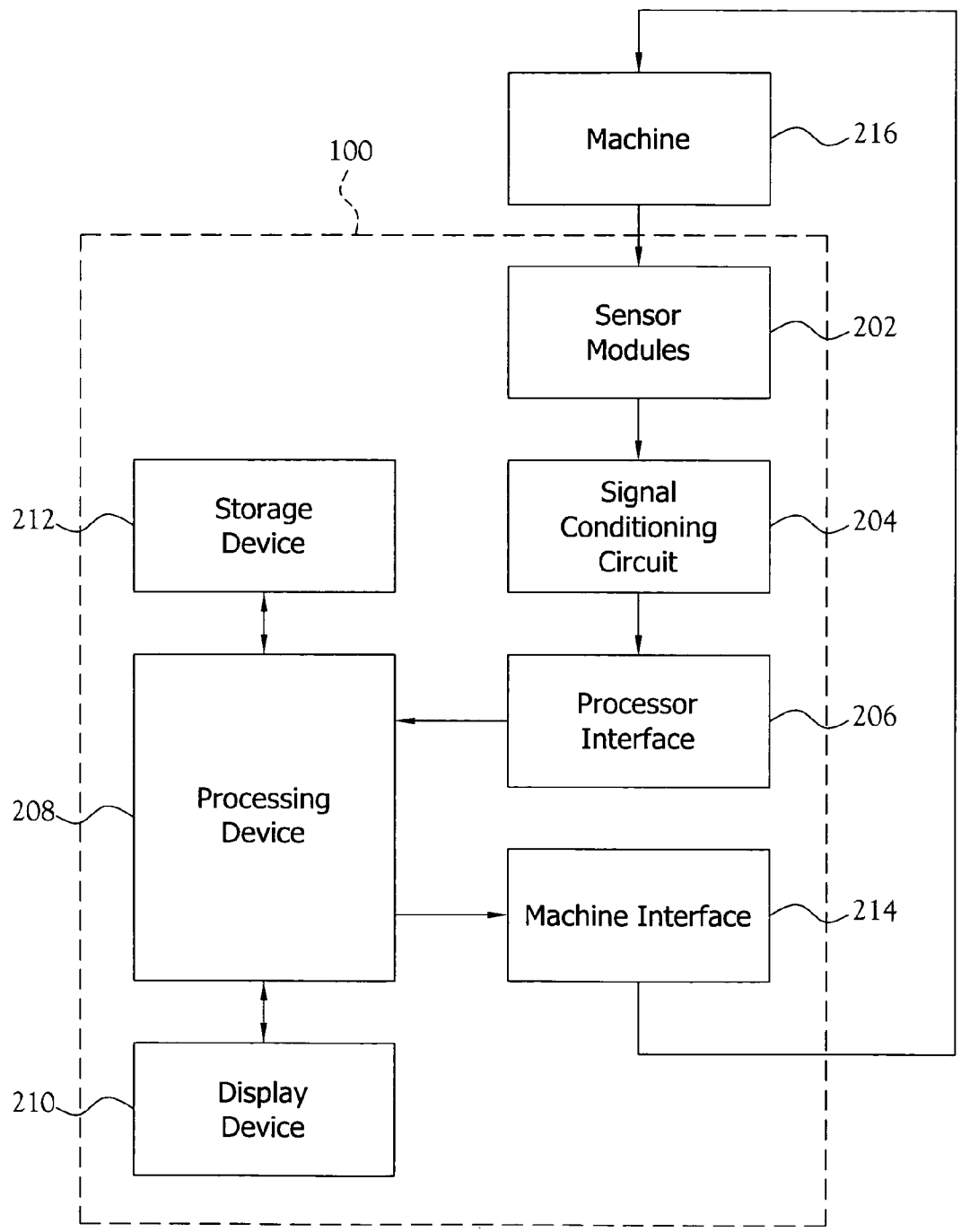
FIG. 2 is a block diagram of the flexible process optimizer.

FIG. 2 illustrates a block diagram of the flexible process optimizer 100 of the present invention. The flexible process optimizer 100 accepts a number of module circuits 202 that monitor various parameters through transducers or probes attached to a target machine 216. The outputs of the module circuits 202 are conditioned by an appropriate signal conditioning circuit 204. A processor interface 206 connects the flexible process optimizer 100 to an processing device 208, such as an external personal computer. In one embodiment, the processor interface 206 includes an interface port known to those skilled in the art, including but not limited to PCM-CIA, PCI, serial, parallel, IEEE 1394, and USB. Connected to the processing device are a display device 210 and a storage device 212. The display device 210 is used to display either or both of the raw data and the processed data. The display device 210 also provides the user interface to permit the entry of user specific information for the production system, the desired sensor range, desired display, the desired process control limits, and other setup information. The storage device 212 saves either or both of the raw data and the processed data. Finally, the machine interface 214 communicates directly with the controller of the target machine 216. The machine interface 214, the flexible process optimizer 100 reads the current controller settings. The setting information is combined with the values measured during the process cycle to allow the user to see how the process responds to the controller settings. Through the flexible process optimizer 100, the user adjusts the controller settings to optimize the process and the machine interface 214 adjusts the settings of the controller in the target machine 216. Those skilled in the art will recognize that the processing device can be integrated into the flexible process optimizer without departing from the scope and spirit of the present invention.

Figure 3:
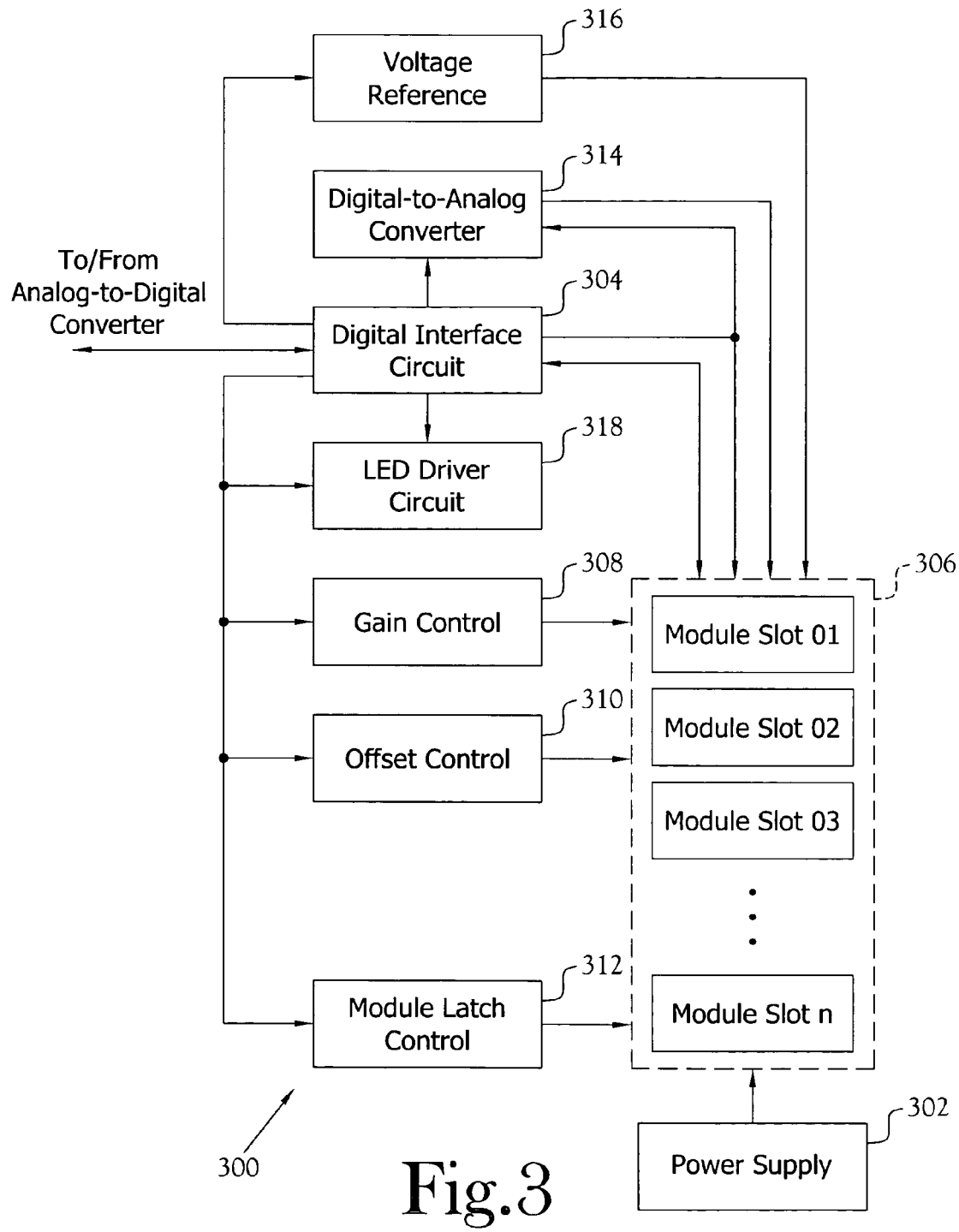
FIG. 3 is a block diagram of the main circuit of the flexible process optimizer.

FIG. 3 illustrates one embodiment of the main circuit 300 of the flexible process optimizer in greater detail. The main circuit 300 includes a power supply 302. In one embodiment, the power supply 302 is a universal input (90 to 260 volts) switch mode power supply providing +3.3, +5, +12, −12, +15, and −15 volt dc outputs. The 3.3 and the 5-volt outputs are generally used to power digital circuits while the 12 and 15 volt outputs are generally used to power analog circuits. Those skilled in the art will recognize that other voltages can be supplied by the power supply 302 as necessary. A digital interface circuit 304 on the main circuit 300 interfaces an analog-to-digital converter (ADC) card of a personal computer and the flexible process optimizer 100. The special codes that are generated by the flexible process optimizer software are decoded in this circuit. The internal buses are also generated by the digital interface circuit 304. The main circuit 300 also includes a number of module slots 306 in which various module circuits can be plugged to customize the flexible process optimizer 100. The set of modules plugged into the module slots 306 determines the configuration of the flexible process optimizer 100 and, in association with the system software, fixes the application of the flexible process optimizer 100.

The main circuit 300 has several controls for adjusting various parameters of the attached modules. A gain control circuit 308 generates the control signals required by the individual modules for applying a gain to the input signal. The gain control circuit 308 can include a multiple-stage gain control to allow both coarse and fine control of the gain or one or more single-stage gain controls accomplishing the same effect. An offset control circuit 310 generates the control signals required by the individual modules for applying an offset to the input signal. The offset control circuit 310 can include a multiple-stage offset control to allow both coarse and fine control of the offset or one or more single-stage offset controls accomplishing the same effect. The main circuit further includes a module latch control circuit 312 that generates the control signals required for latching the mode, filter, LVDT excitation, coarse gain information in the individual modules. It will be understood by those skilled in the art that the various controls can be replicated to provide the required number of unique controls. Replication allows for individual control over separate modules, for example gain and offset, or the generation of multiple unique signals for a single module, for example multiple latch controls.

A digital-to-analog converter (DAC) circuit 314 generates a diagnostic voltage for the attached modules with the desired resolution. The DAC 314 generates an appropriate diagnostic voltage, which can be adjusted with the precision of the number of available millivolt steps under control of the system software. The diagnostic voltage is also used for calibrating the different sensors under control of the system software. A standard +5 or +10-volt reference 316 is included for calibrating the module circuits and the various sensors under control of the system software. A light-emitting diode (LED) driver circuit 318 illuminates a plurality of LEDs that indicate the presence and/or status of the various modules present in the flexible process optimizer 100.

Figure 4:
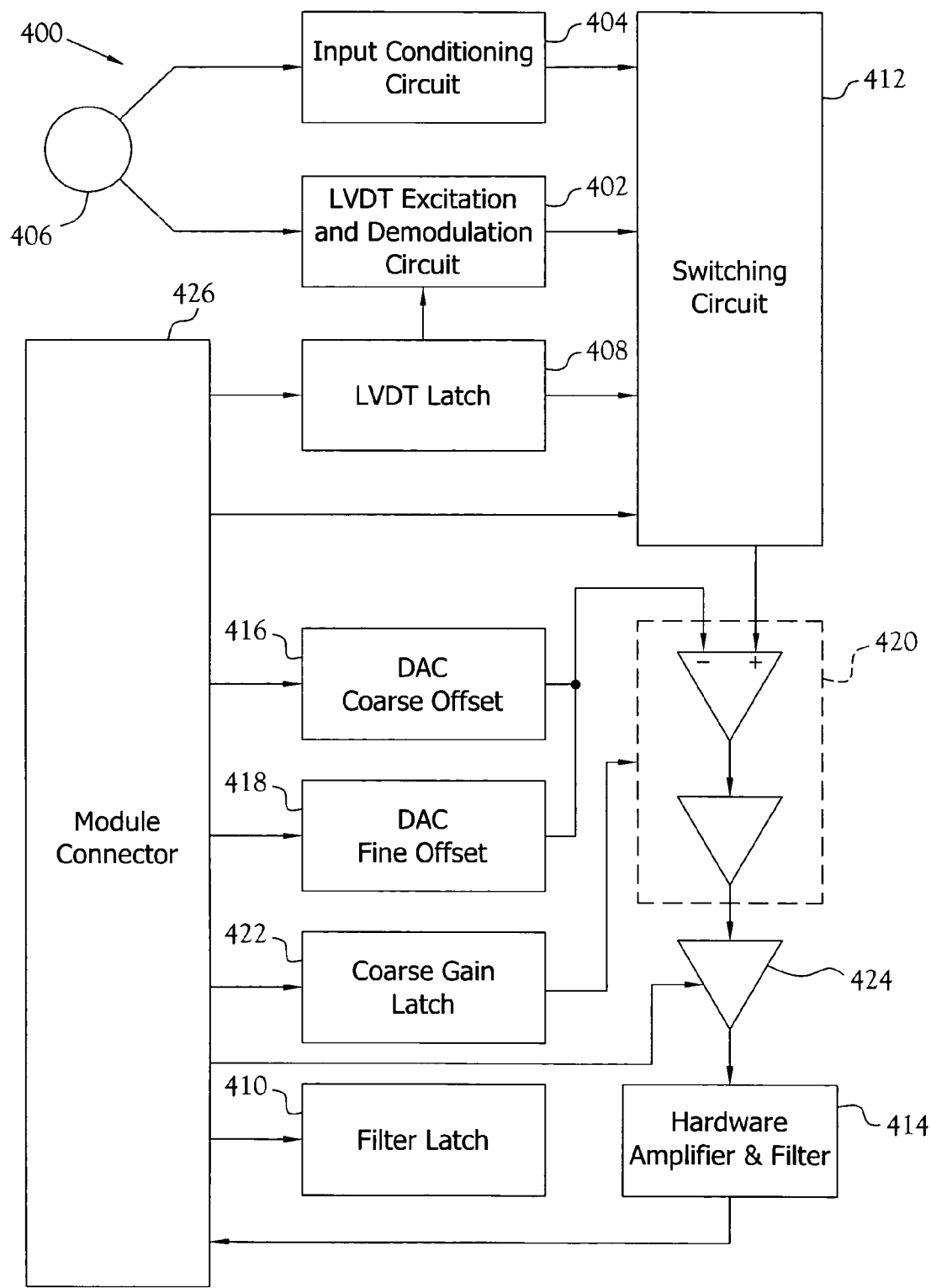
FIG. 4 is a block diagram of a general purpose module circuit for use with the flexible process optimizer.

FIG. 4 illustrates one embodiment of a general purpose module circuit 400 adapted to accept inputs from a sensor 406, such as a linear variable differential transformer (LVDT), a 4 to 20 milliamp current loop, a dc voltage sensor, or a differential voltage sensor for use in the flexible process optimizer 100 of the present invention. The input type is selected from the system software. In order to directly accept inputs from a variety of ac type LVDTs, a LVDT excitation and demodulation circuit 402 is built in the module 400. The LVDT excitation and demodulation circuit 402 generates the necessary ac excitation voltage and frequency for the LVDT primary. The excitation voltage and frequency are varied under the control of the system software. The LVDT excitation and demodulation circuit 402 also produces a dc voltage corresponding to the LVDT displacement. Other inputs are accepted from an input conditioning circuit 404 that converts 4 to 20 milliamp and differential voltage signals to a dc voltage. The input conditioning circuit 404 includes a preamplifier stage to avoid any loading on the output of sensors. Those skilled in the art will recognize that module can be modified to accept less than all of the inputs described without departing from the scope and spirit of the present invention. For example, the module can be configured without the LVDT excitation circuit and corresponding input circuitry or, alternatively, the module can be configured without the input circuitry for accepting a differential input or the input from a current loop.

The module 400 transfers signals to and from the flexible process optimizer 200 through a module connector 426 adapted to be received within a module slot 300. A first latch 408 holds the value of the LVDT excitation voltage and the types of input selected like DC, differential etc. A second latch 410 holds the filter value. It holds one of the possible values of the filter. Those skilled in the art will recognize other devices such as a memory can be used for holding the filter or other values without departing from the scope and spirit of the present invention. A switching circuit 412 selects one of the inputs like dc, LVDT, +5V reference voltage, etc., under the control of the system software. The switching circuit 412 also contains an analog switch that provides a pass-through feature, which passes the input signal to the adjacent module hardware via the main circuit 300. This feature allows any connected input to be calibrated to two different ranges through the hardware of two adjacent modules and the input data can be acquired, viewed, and saved on two separate channels. A hardware amplifier and filter 414 is implemented using a low-pass analog or digital filter circuit applied to the sensor output. There are a number of different time constants that can be selected under control of the system software. A DAC coarse offset control circuit 416 generates a coarse offset voltage under control of the system software. In one embodiment, the maximum offset voltage is approximately 10 volts in steps of a few millivolts. A DAC fine offset control circuit 418 generates a fine offset voltage under control of the system software. In one embodiment, the maximum offset voltage of a few millivolts in fractional millivolt steps. A two-stage coarse gain amplifier 420 under control of the system software. In one embodiment, the two-stage coarse gain amplifier 420 is implemented using a special low noise amplifier and offers precision gain steps in the range of 1 to about 10,000. A third latch 422 holds the coarse gain value under control of the system software. A fine gain amplifier 424 amplifies the input with a gain in the range of about unity to about 10. The gain range of the fine gain amplifier 424 is divided into a number of steps, for example offering up to 10,000 gain increments between 0 and 10 and is selected through the system software.

Figure 5:
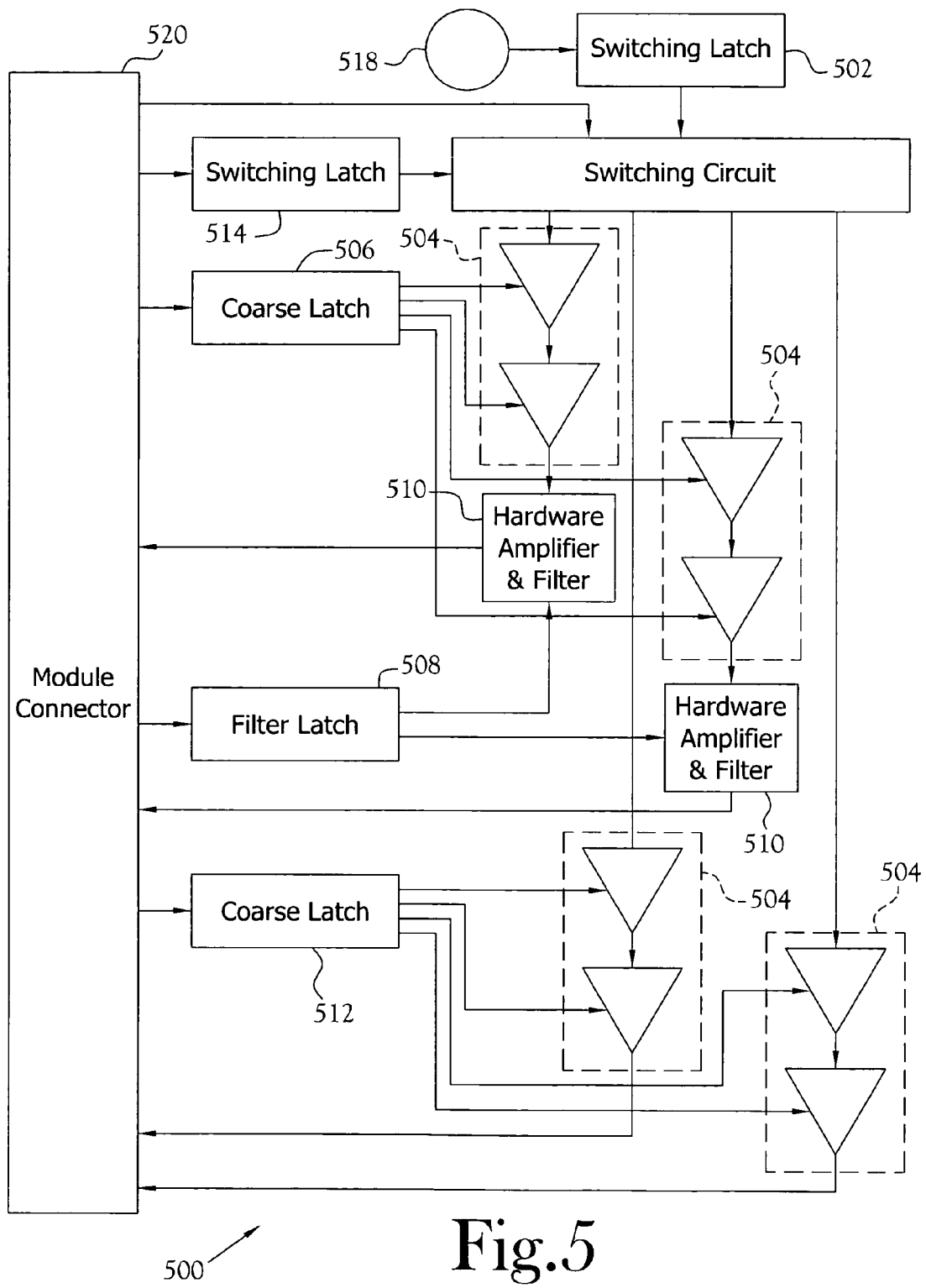
FIG. 5 is a block diagram of a vibration module circuit for use with the flexible process optimizer.

FIG. 5 is a block diagram of a vibration module circuit 500 for use in the flexible process optimizer 100 of the present invention. In one embodiment, up to four piezoelectric vibration sensors 518 can be connected to the vibration module circuit 500. No external power source for the sensors 518 is required as power for the sensors is supplied from the base current through the module circuit 500. The vibration module circuit 500 transfers signals to and from the flexible process optimizer 100 through a module connector 520 adapted to be received within a module slot 306. A piezoelectric vibration sensor 518 requires a constant current power supply 502. A multiple-stage coarse gain circuit 504, which in the illustrated embodiment is a two-stage circuit, is provided for each vibration sensor input. The system software controls the gain of each multiple-stage coarse gain circuit 504 in steps in the range of 1 to about 1,000. For the first and second vibration sensor inputs, a first coarse latch circuit 506 holds the gain value of coarse gain amplifiers. A filter latch 508 holds the filter step of the associated hardware amplifier and filter 510. Each hardware amplifier and filter 510 is a low pass filter circuit with one of a number different time constants that are controlled through the system software. The low pass filter is applied to the sensor signal after amplifier through the multiple-stage course gain circuit 504. The third and fourth vibration sensor inputs are handled either simultaneously or independently, as shown in FIG. 5. A second coarse latch 512 holds the gain value of the coarse gain amplifiers 504 associated with the third and fourth vibration sensors. There is no hardware filter associated with the third and fourth vibration sensor inputs in the illustrated embodiment; however those skilled in the art will recognize that any or all of the sensor inputs can include analog or digital filters without departing from the scope and spirit of the present invention.

A switching latch 514, under the control of the system software, holds the status of a switching circuit 516 such as the module and connector identifier, the diagnostic voltage, etc., thereby controlling the output of the switching circuit 516. The switching circuit 516 switches to the signal based on the value stored in the switching latch 514. The switching circuit 516 sends selected signal to the analog and digital outputs of the module.

Figure 6:
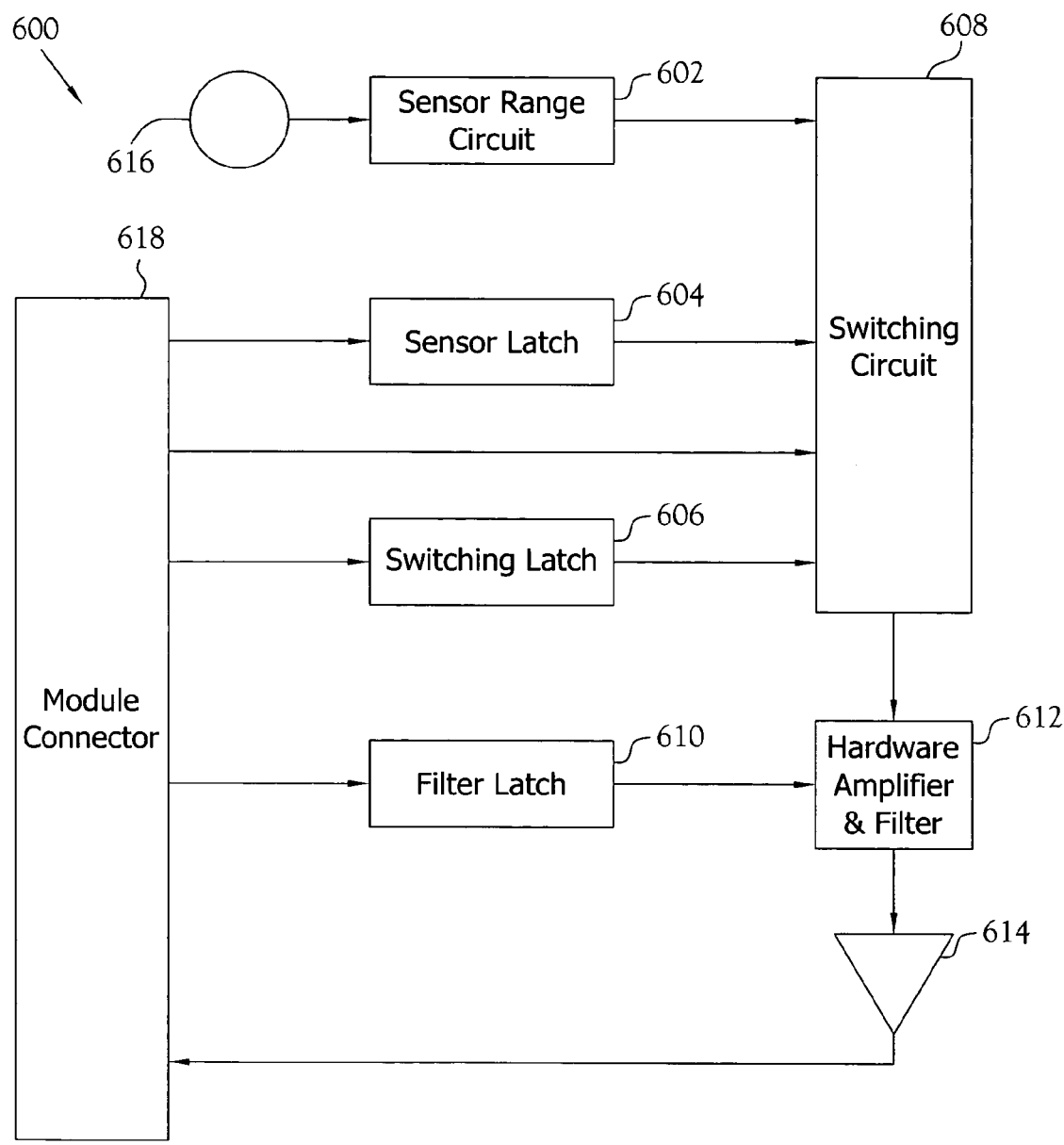
FIG. 6 is a block diagram of a power module circuit for use with the flexible process optimizer.

FIG. 6 is a block diagram of a power module circuit 600 for use in the flexible process optimizer 100 of the present invention. The power module circuit 600 transfers signals to and from the flexible process optimizer 100 through a module connector 618 adapted to be received within a module slot 306. A sensor range detection and range setting circuit 602 interfaces with a power sensor 616, such as that produced by Monitech Systems, Inc., to read the range of the power sensor 616. Controlled by the system software, the sensor range detection and range setting circuit 602 provides the ability to change the range of the power sensor 616. The power module circuit 600 also includes a sensor latch 604, which is under the control of the system software, that holds the range value of the power sensor 616. A switching latch 606 holds the commands from the system software to select the module identifier, the diagnostic voltage, the reference voltage, etc. A switching circuit 608 switches to the signal based on the value stored in switching latch 606 and sends the module identifier, the diagnostic voltage, or the reference voltage to the analog output of the power module circuit 600. A filter latch 610, which is controlled by the system software, holds the step value of hardware filter. A hardware filter and amplifier 612 is a low pass filter circuit with one of a number of different time constants controlled through the system software. The low pass filter is applied to the sensor signal after the amplifier output. A buffer amplifier 614 buffers the signal at the output stage.

Those skilled in the art will recognize that the number of values available, the number of stages available, the size of the steps, the ranges of adjustment, and the maximum values can be varied based upon the hardware components and the specifications of the various module circuits can vary without departing from the scope and spirit of the present invention.

The flexible process optimizer 100 allows the users of existing machines without built in sensors to obtain key data and observe patterns that allow the user to gain control of the operation without making major alterations to the machines in the production environment. The flexible process optimizer 100 provides a balanced and easy-to-use control strategy and empowers the user to tailor the control to the user's specific need in any particular production operation. A balanced control strategy is defined in terms of controlling multiple output parameters of specific interest to a user.

One application of the flexible process optimizer 100 is monitoring and controlling a precision production grinding machine. A typical production grinding operation consists of feeding the rotating grinding wheel into a rotating workpiece (or vice versa) by means of a slide carrying the moving member. Material is removed from the workpiece at a certain rate during the interaction of the workpiece and the grinding wheel until the workpiece diameter reaches a desired size and surface finish. The infeed of the movable member, say the grinding wheel, is controlled carefully at various feed rates during the production cycle to provide the grinding pressures to remove the desired material as well as to finish the work piece surface in an acceptable cycle time. The feed rates are dependent upon the capabilities of the machine and the grinding wheel in use. In one embodiment, the flexible process optimizer 100 takes the sensor signals, performs the needed signal conditioning, and displays the data on a visual display. The user analyzes the visual display and makes manual control adjustments to the operation of the production grinding machine. In another embodiment, more sensors, data analysis features, and control lines are interfaced with the hardware of the production grinding system and its CNC control to allow control of the production process. The desired process control is effected by changing the machine feed rates and the change points along with the wheel dressing conditions and wheel dressing frequency. During this process the finished ground part quality data such as actual final size, taper, and, roundness are stored for quality inspection and reporting purposes.

In production grinding, examples of the quantitative parameters may include the grinding wheel hungriness; that is its ability to remove material from a workpiece. Hungriness is usually not measured and yet it is a major cause of inefficiency and lack of control in production grinding operations. By nature, the key process parameters required for an effective process control depend upon the industrial process being monitored. In addition to the discrete component grinding and machining industry, continuous processes in industries such as: paper and pulp processing, food processing, pharmaceutical processing, and paints and chemical processing have a large number of special parameters such as: mixture consistency, temperatures, humidity, etc., which determine the product quality as well as the system productivity.

Using precision grinding to illustrate the present invention, there are typically three sensors used for monitoring the machine. These include a power sensor to measure grinding wheel power consumption, an infeed sensor to measure the grinding wheel (or workpiece) slide, and a gauge head sensor to measure the instantaneous diameter of the work piece during the actual grinding operation. The grinding wheel power consumption is considered a process output, the infeed is considered a process input, and the diameter is considered a product quality attribute, which is indicative of the system output. With these three measurements recorded and displayed by the flexible process optimizer 100, the user has sufficient information to determine the best optimization strategy and make the necessary adjustments to the grinding machine to improve the efficiency of practically any grinding process.

For a balanced optimization and control of the process in a production grinding system, other parameters of interest include a ground component end-to-end taper, the total grinding cycle time, and other features of certain process parameters during a particular phase of the grinding cycle. One such feature is the grinding power. Whether the grinding power is kept high or low and is maintained at a certain level for a certain duration during the grinding operation affects the final component size (within the resolution capability of the in-process size control gauge) and the component surface roughness, roundness, and taper. The need for a user definable flexible process optimizer arises from the fact that the ground product quality on a given production machine varies with the condition of the grinding wheel and the equipment as well as incoming part quality and these also significantly affect the production cycle times.

In an advanced application of the flexible process optimizer to a precision production grinding machine, multiple sensors are used. The basic sensors include pulse encoders or LVDT probes for monitoring machine slide movements, speed sensors to track the grinding wheel and workpiece rotational speed, power sensors for measuring the wattage consumption of the wheel, the workpiece, or a rotary wheel dressing device, and a part size and geometry (taper or roundness) sensor. However, still more sensors may be used for monitoring the operation of the machine such as sensors to measure coolant flow rate, pressure, or temperature, etc. The flexible process optimizer 100 of the present invention is adaptable, through replaceable module circuits, to measure most any variable that causes or detects process variability. In addition to monitoring the process data, the flexible process optimizer 100 can also measure the vibration at selected locations of the machine during the actual grinding operation. Such information generally relates with the condition of machine spindles and other structural pieces which can cause poor product quality deterioration and is taken at faster data rates than the typical slow process data designed to capture process changes which are much slower.

Figure 7:
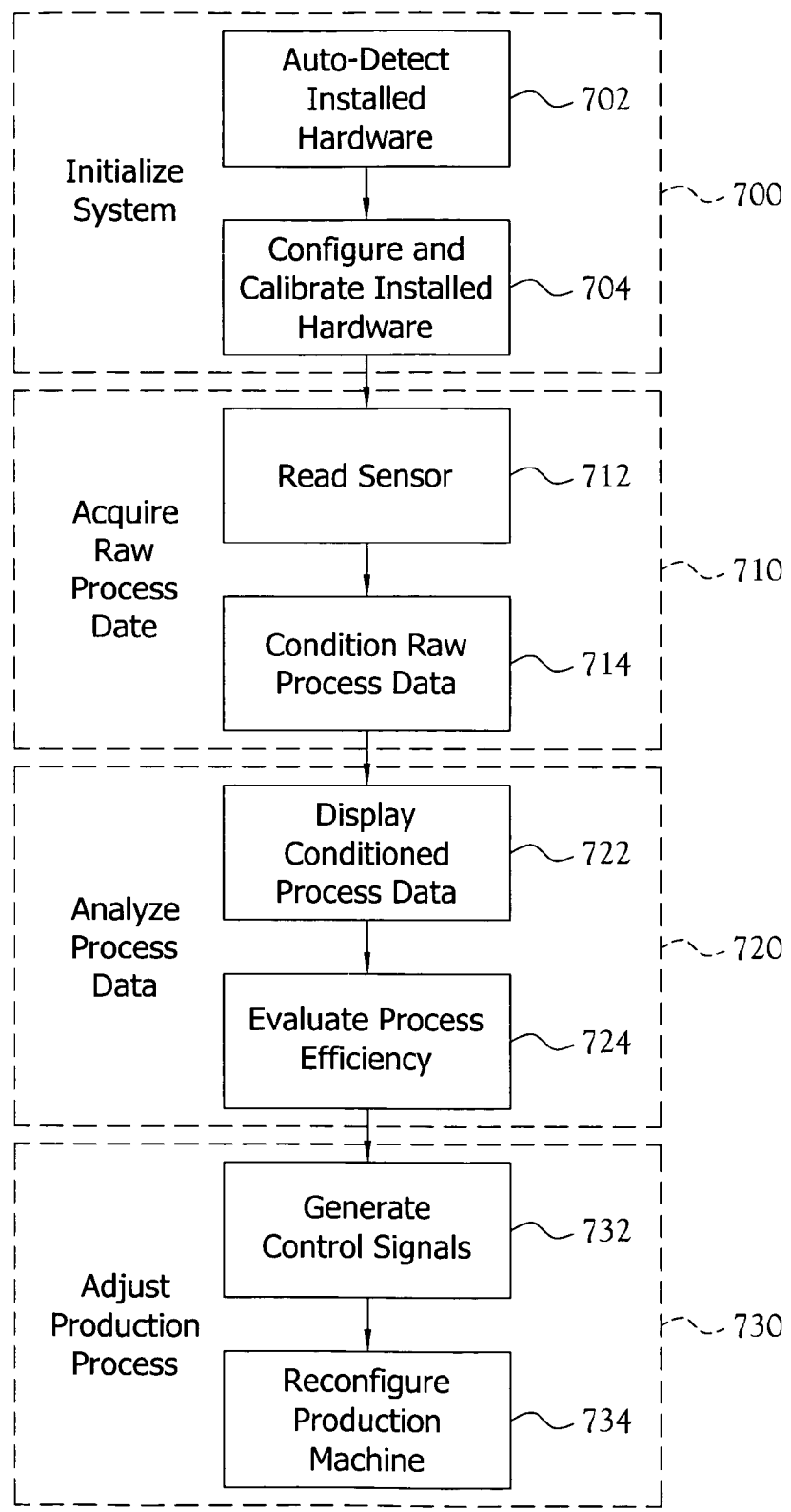
FIG. 7 is a flow chart of the major functions of the flexible process optimizer.

FIG. 7 illustrates a flow chart of the major functions of the flexible process optimizer 100, which are controlled through the processing device running the system software. The first major function is the initialization of the flexible process optimizer 700, which includes the auto-detection of installed module circuits 702 and the automatic configuration and calibration of installed module circuits 704. The second major function is the acquisition of data 710, which includes reading the sensors attached to a production machine 712 and conditioning the input signals 714. The third major function is the evaluation of the acquired data 720, which includes displaying the process data 722 and the evaluation of process efficiency based upon the conditioned process data 724. The last major function is the generation of control signals to adjust parameters of the production machine to improve the efficiency of the production process 730, which includes the generation of control signals for adjusting the machine process 732 and the reconfiguration of the production machine using the control signals 734.

Figure 8:
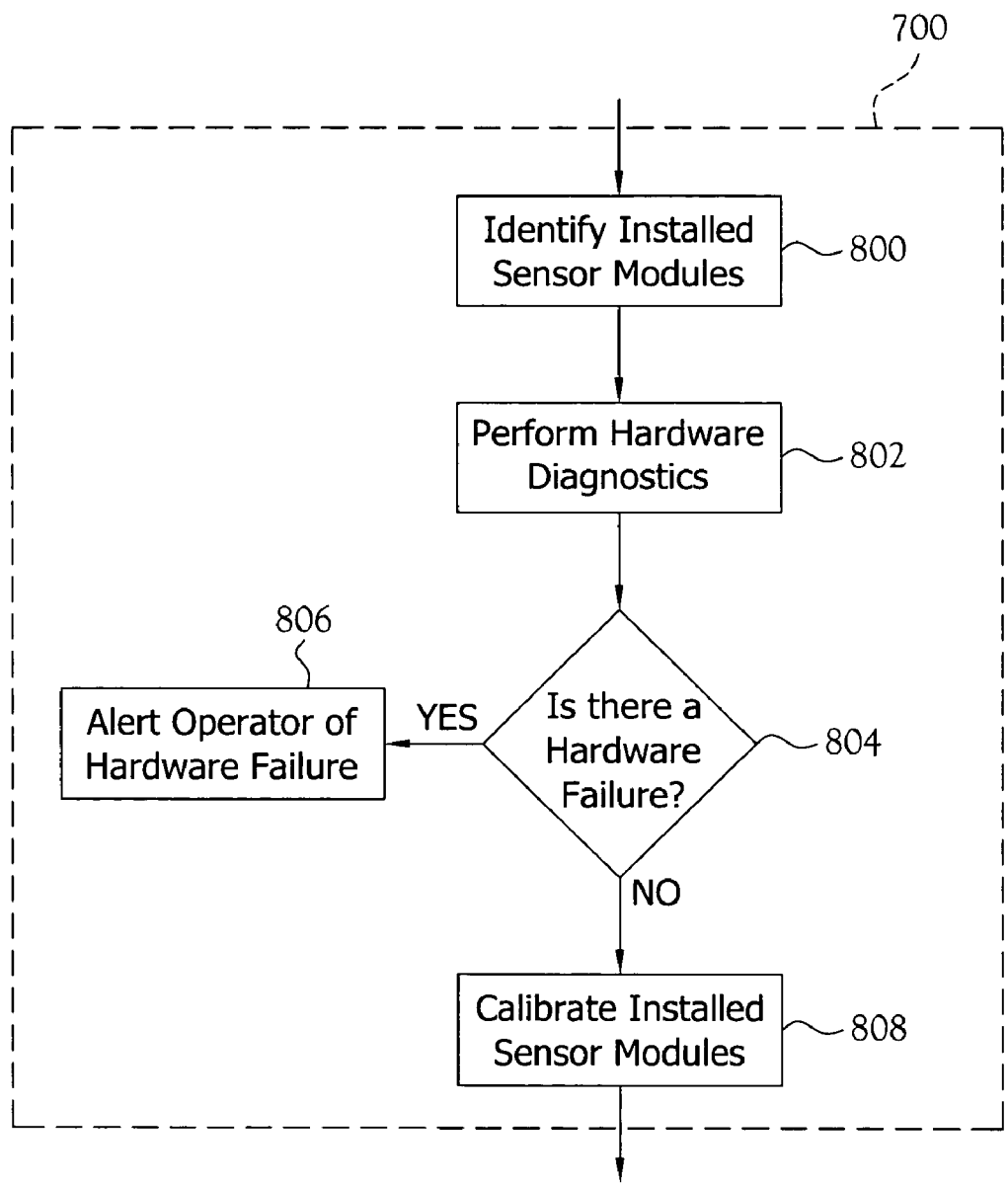
FIG. 8 is a flow chart of the initialization function of the flexible process optimizer.

FIG. 8 charts the flow of the initialization function 700 in greater detail. First, the system software queries the flexible process optimizer 100 to identify the installed module circuits 800. The system software automatically performs diagnostic testing 802 on the main circuit and the installed module circuits to verify proper operation of the hardware. If the main circuit or any of the installed module circuits fail testing 804, the user is notified of the failure 806. Next, most of the properly functioning module circuits are automatically calibrated by the system software 808.

Figure 9:
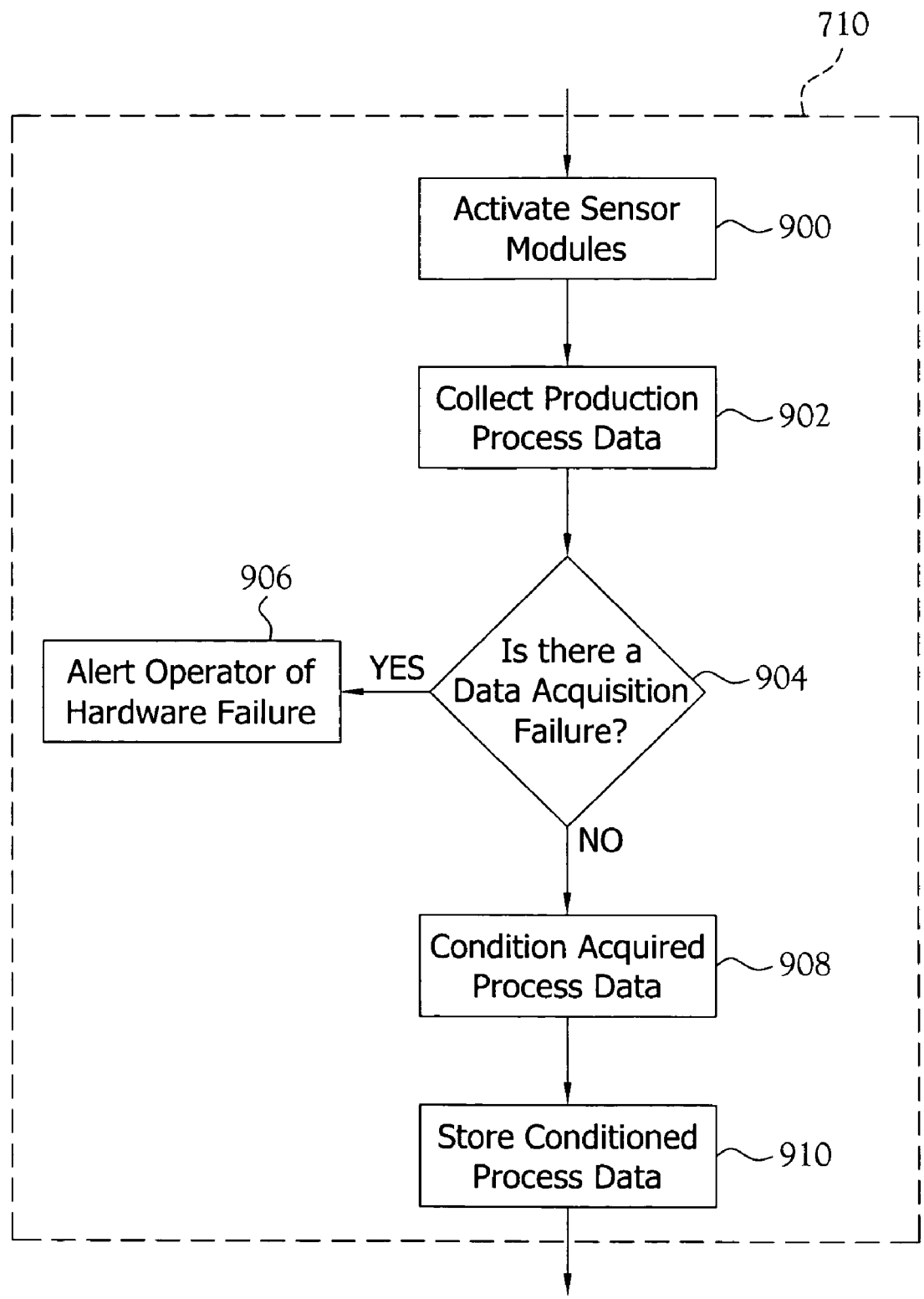
FIG. 9 is a flow chart of the data acquisition function of the flexible process optimizer.

FIG. 9 charts the flow of the data acquisition function 710 in greater detail. The system software activates the various sensors 900. From the production machine, the various sensors collect signals 902 related to the production process. The data acquisition process is monitored to identify a problem in data acquisition, such as a malfunction in the controller, the monitor unit, or the module circuits, or the disconnection of a sensor 904. If a data acquisition interruption occurs, the user is notified 906. The acquired data is conditioned for analysis 908. Finally, the conditioned data is stored for analysis 910. Those skilled in the art will recognize that the analysis may occur in real-time and rely solely on temporary storage or the data may be stored for later analysis or historic purposes in a non-volatile storage medium. Under control of the system software, the flexible process optimizer 100 is capable of running unattended with scheduled data storage intervals. The storage of data can also be triggered by the occurrence of certain events as configured by the user.

Figure 10:
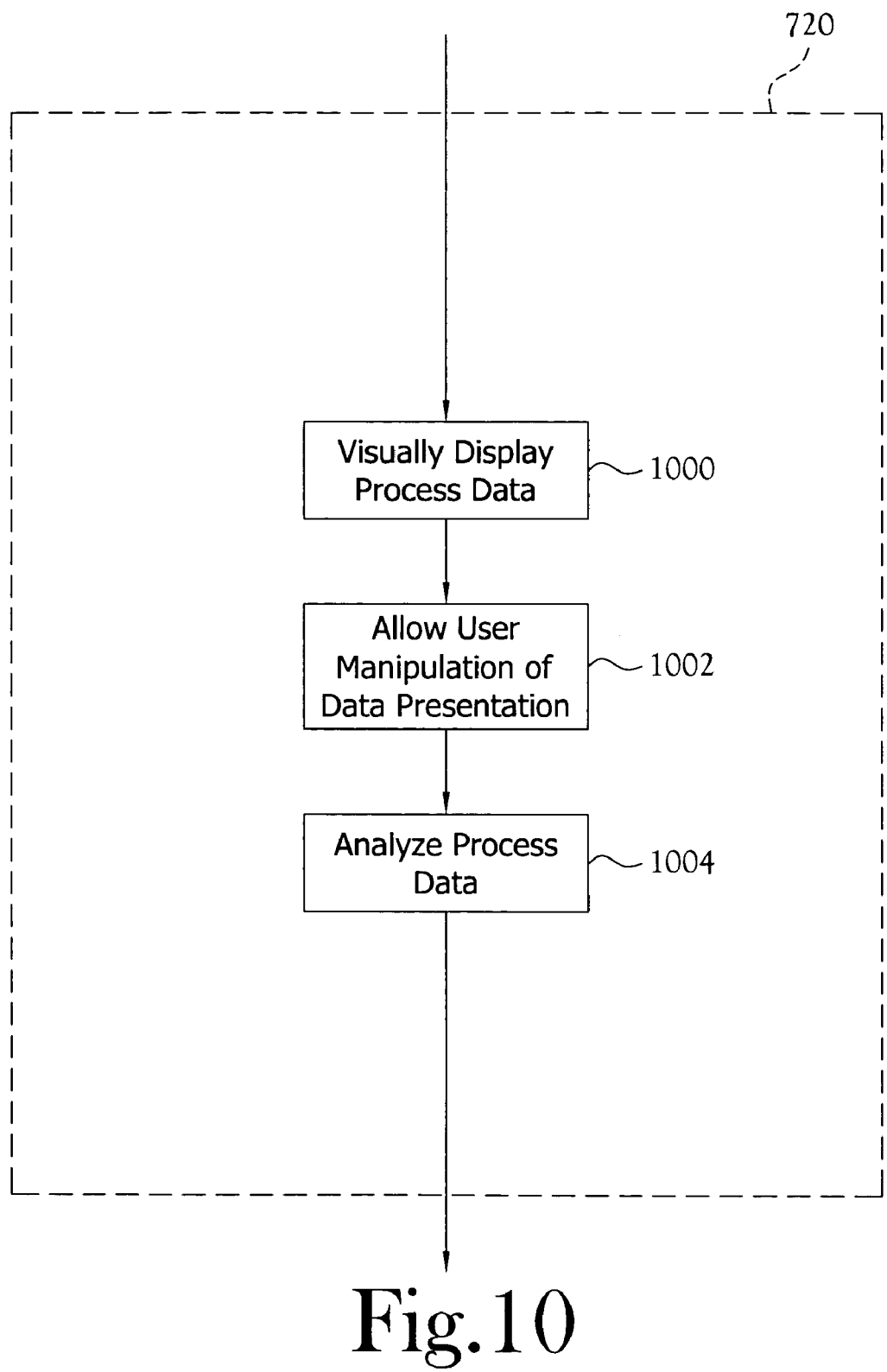
FIG. 10 is a flow chart of the data analysis function of the flexible process optimizer.

FIG. 10 charts the flow of the data analysis function 720 in greater detail. The acquired and conditioned data is visually displayed for evaluation by a user 1000. From the visual display, the user can evaluate the production process and make adjustments to the production process manually or verify that the production process is running efficiently under control of the flexible process optimizer 100. The user is provided with control over the presentation of the data 1002. Some of the various parameters that are under the user's control include the scale and the time base of the display window. An offset can be applied to any data input to position the data input at a desired location in the data display window.

The polarity of any sensor input can be inverted by the system software for easier display and more meaningful analysis. The system software also provides the ability to filter electronic noise by applying a variable filter applied to a noisy input or to noisy saved data. The system software also allows a user to view data from the same sensor at multiple scales and time bases simultaneously for improved evaluation of the process data. The system software also allows the user to connect a sensor to a single module slot 306 and view the same sensor data through two adjacent modules. Because the gain and offset of the modules are individually controlled, the same sensor data can be viewed with two different gains and/or offsets. The on-screen position of the process data is variable by an automatic offset removal function provided through the system software. Finally, the signal conditioning electronics of the flexible process optimizer 100 are responsive to the system software to allow sensor calibration for a wider range and actual operation at a smaller range. Using this technique data may seem off-scale while being acquired; however, saved data is repositionable when recalled. This enables the flexible process optimizer to capture data at high resolution in a much wider effective range over a long period of time for unattended process monitoring of production systems. Using data analysis tools, inefficiencies in the production process are identified 1004. The process data is analyzed using various data analysis techniques known to those skilled in the art, including statistical analysis, heuristic data analysis, pattern matching, and the application of specific algorithms.

Figure 11:
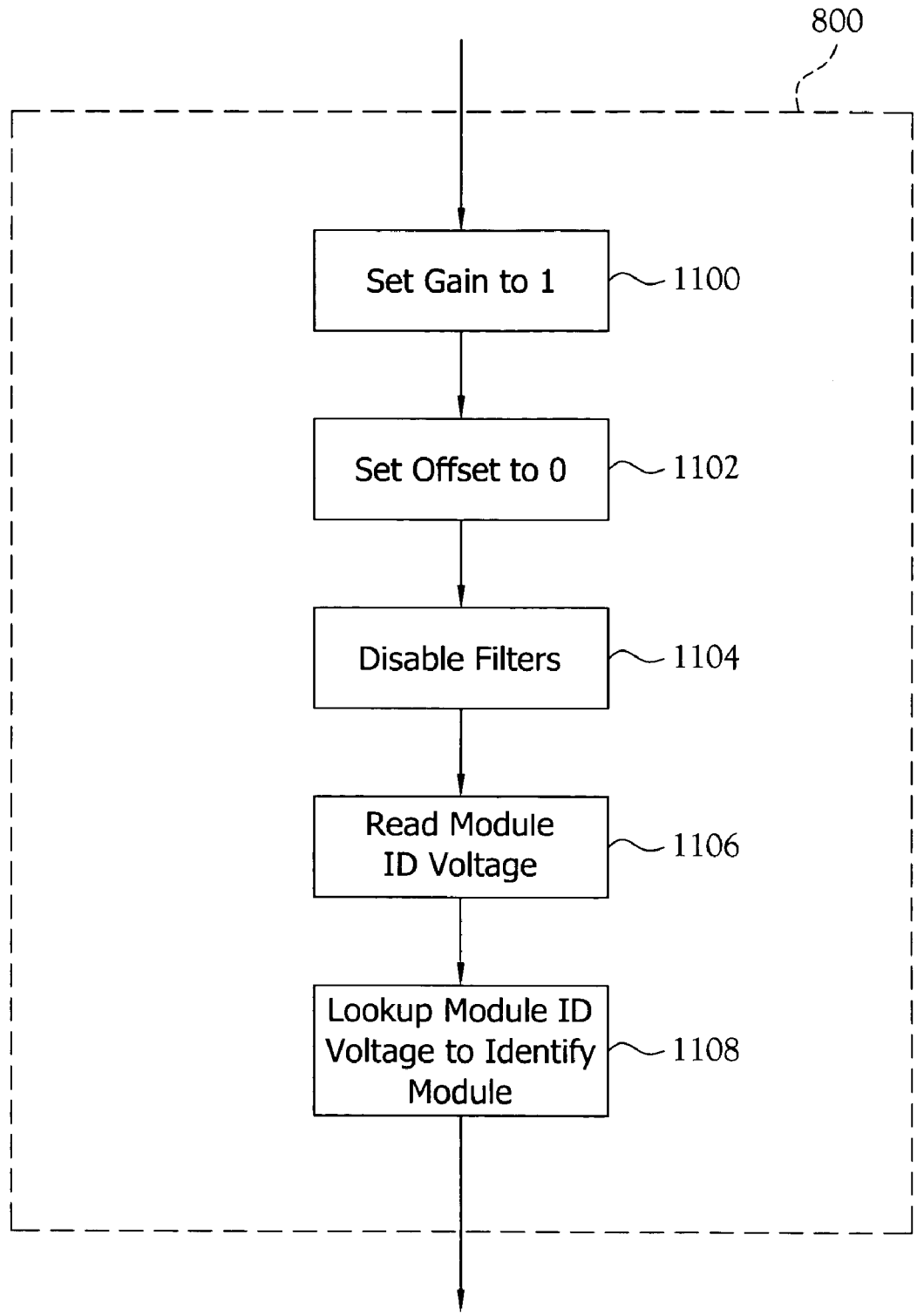
FIG. 11 is a flow chart of the module detection function of the flexible process optimizer of the present invention.

FIG. 11 charts the flow of the module detection function 800 in greater detail. The module detection function 800 initializes the hardware by setting the coarse gain and the fine gain to unity 1100 and by setting the coarse offset and the fine offset to zero 1102. Next, the module detection function 800 disables the hardware filters to allow the raw input to be read 1104. The module detection function 800 reads the module identification voltage from the module 1106. The module identification voltage is a voltage specific to a particular module. Identification of the module is completed by looking up the module identification voltage read from the module in a look-up table 1108. The module detection function 800 is repeated until all attached modules are identified. Those skilled in the art will recognize other structures and methods for providing an identifier to the various module circuits and using that identifier to determine which interchangeable module circuits are attached to the flexible process optimizer 100.

Figure 12:
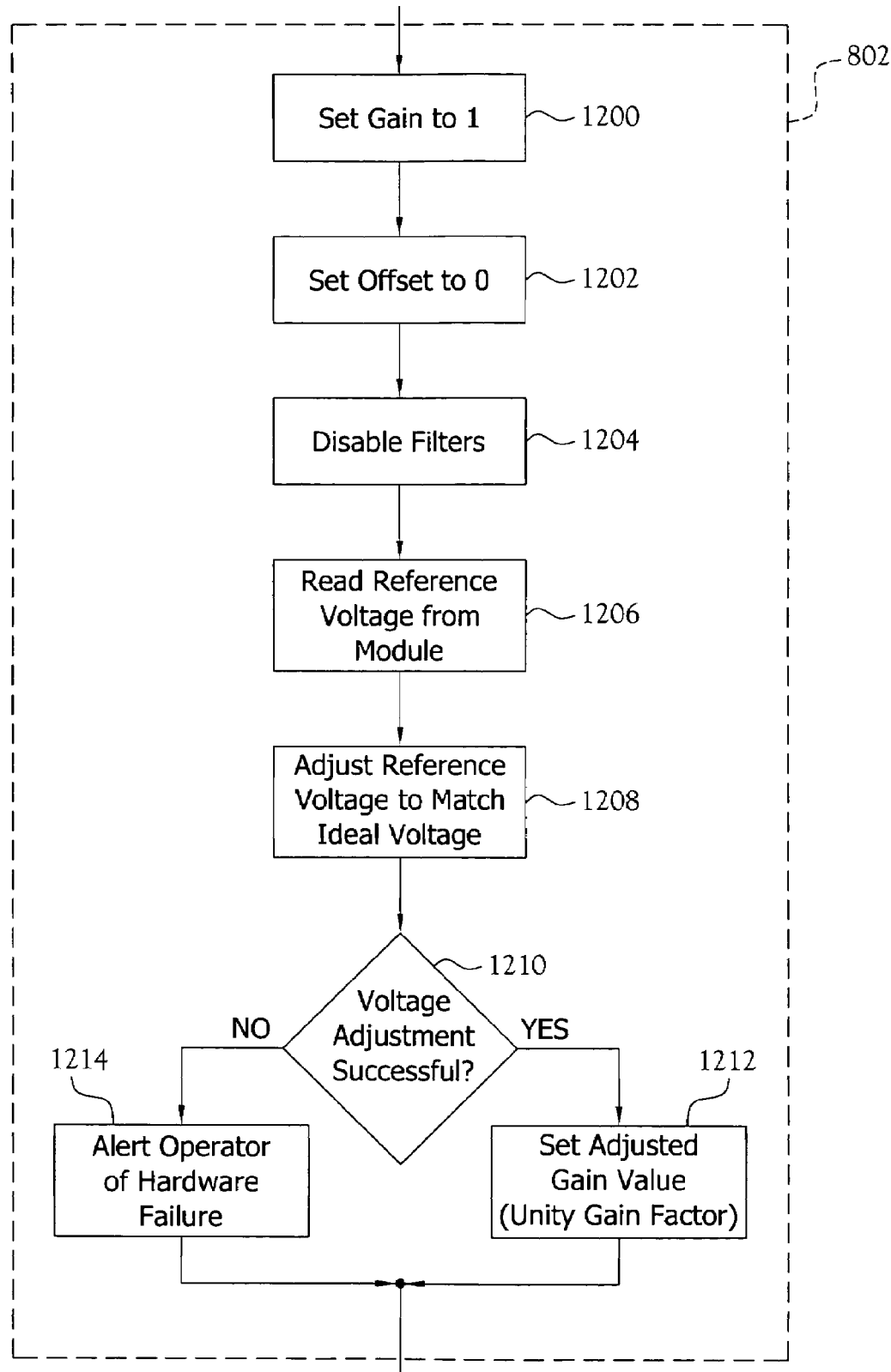
FIG. 12 is a flow chart of the hardware diagnostic function of the flexible process optimizer.

FIG. 12 charts the flow of the hardware diagnostic function 802 in greater detail. The hardware diagnostic function 802 initializes the hardware by setting the coarse gain and the fine gain to unity 1200 and by setting the coarse offset and the fine offset to zero 1202. Next, the hardware diagnostic function 802 disables the hardware filters to allow the raw input to be read 1204. The hardware diagnostic function 802 reads a reference voltage from the module 1206. The fixed reference voltage is the base input voltage for the module. This reference voltage reading varies based upon the tolerances of the components making up the module circuit. The reference voltage is compared to the ideal voltage, which would be read from an ideal module circuit. In general, the reference voltage is close to the ideal voltage so the hardware diagnostic function 802 adjusts the fine gain until the reference voltage equals the ideal voltage 1208. If the fine gain control can be adjusted so that the reference voltage equals the ideal voltage 1210, the hardware is considered to have passed the diagnostic check and the value of the fine gain is stored as the unity gain factor 1212. Otherwise, the user is notified of the hardware diagnostic failure 1214 and other appropriate actions can be taken, such as terminating the monitoring process. The hardware diagnostic function 802 is repeated to verify the proper operation of each attached module.

Figure 13:
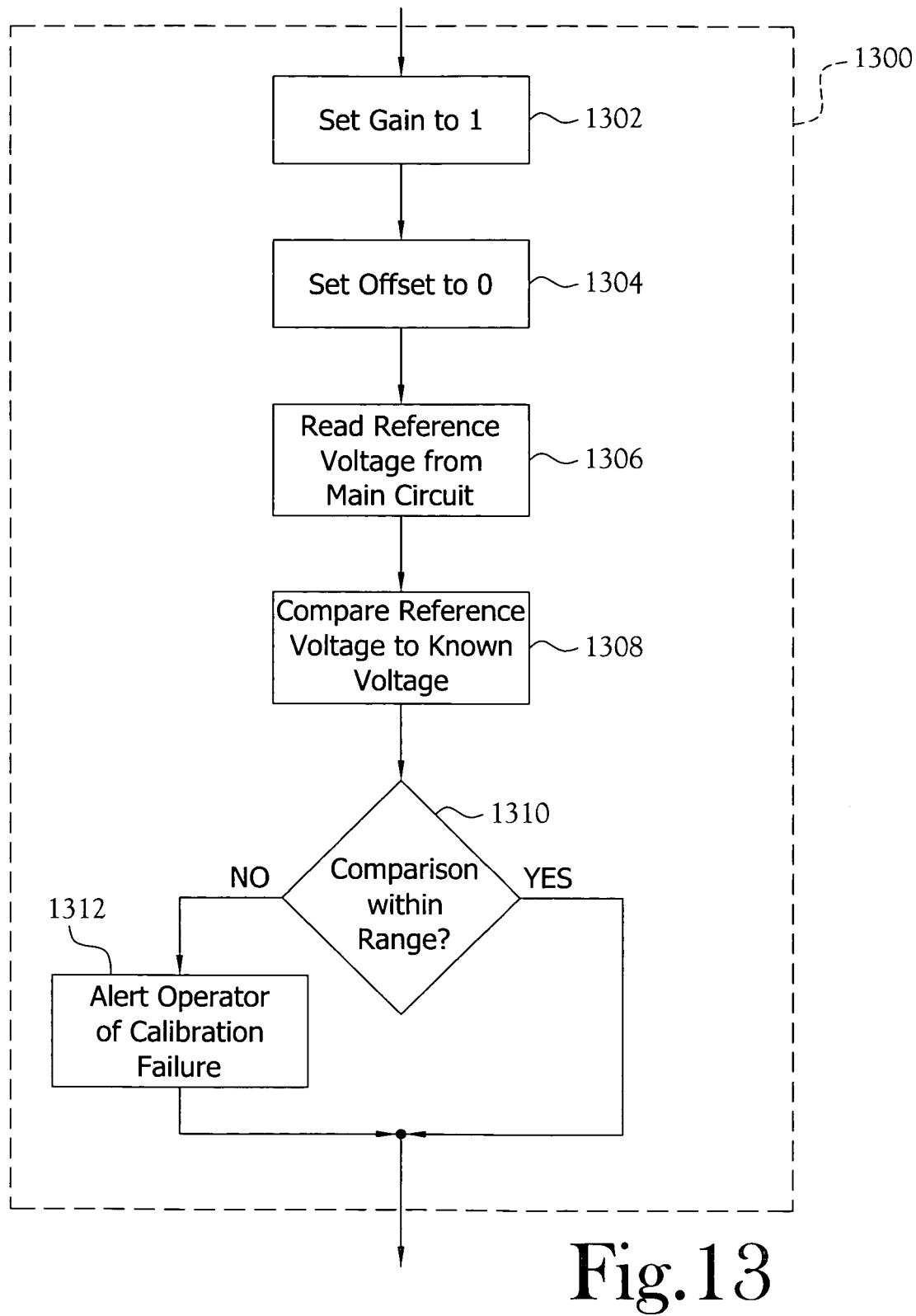
FIG. 13 is a flow chart of the calibration function for the dc inputs of the flexible process optimizer.

FIG. 13 charts the flow of the dc input calibration function 1300, which is a sub-function of the calibration function 808 in greater detail. The dc input calibration function 1300 initializes the hardware by setting the coarse gain and the fine gain to unity 1302 and by setting the coarse offset and the fine offset to zero 1304. The dc input calibration function 1300 reads a reference voltage from the module 1306. The reference voltage is compared to a known voltage range, which represents the input range of the dc input 1308. If the reference voltage is within the known voltage range 1310, the hardware is considered to be properly calibrated. Otherwise, the user is notified of the hardware calibration failure 1312 and other appropriate actions can be taken, such as terminating the monitoring process. The dc input calibration function 1300 is repeated to verify the calibration of each attached module using dc inputs.

Figure 14:
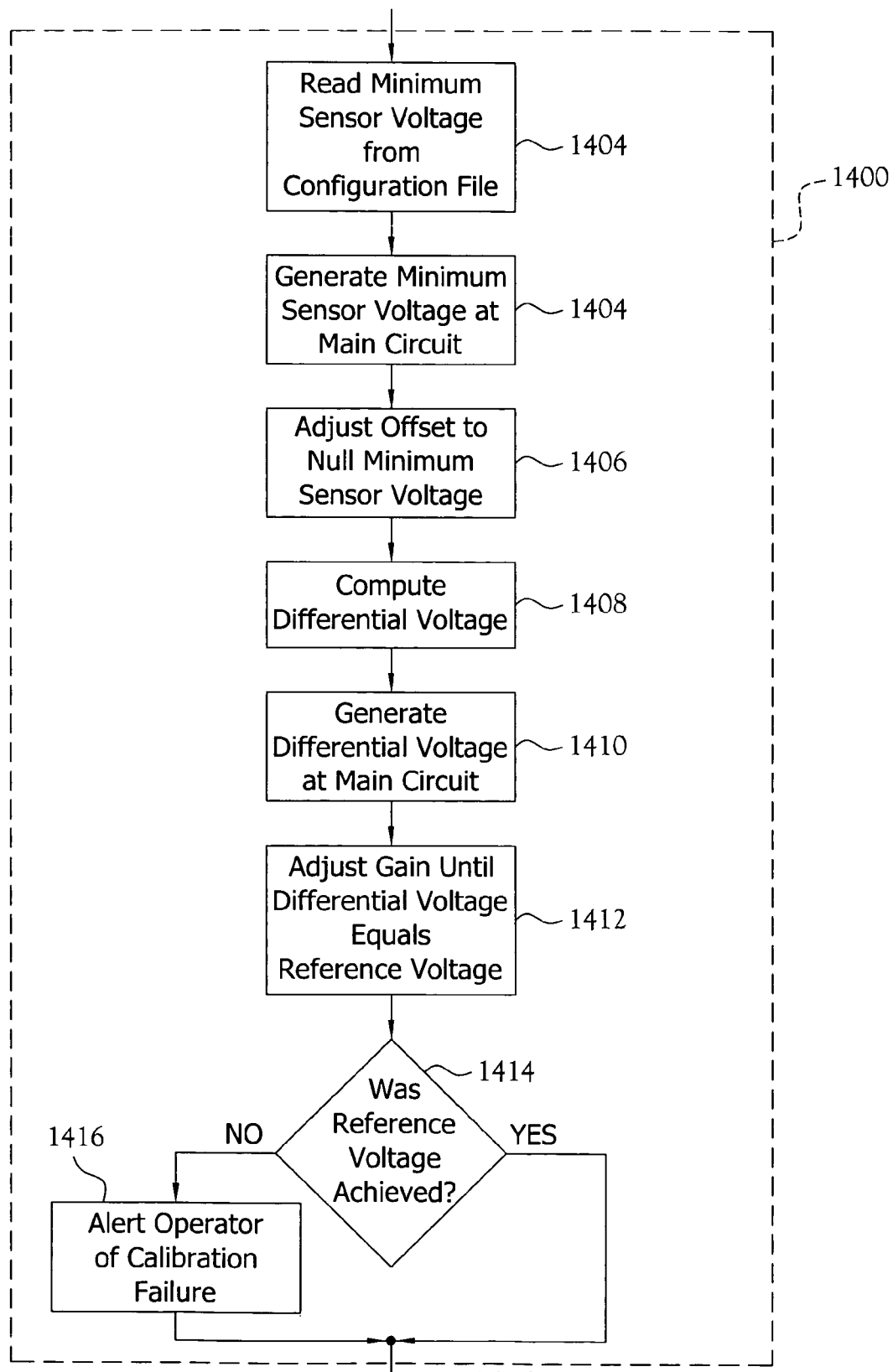
FIG. 14 is a flow chart of the calibration function for the differential inputs of the flexible process optimizer.

FIG. 14 charts the flow of the differential input calibration function 1400, which is a sub-function of the calibration function 808 in greater detail. The differential input calibration function 1400 reads the minimum sensor voltage from the configuration file 1402. The main circuit generates the minimum sensor voltage 1404 and the differential input calibration function 1400 adjusts the coarse offset and the fine offset to null the minimum sensor voltage 1406. With the minimum sensor voltage 1406 nulled, the differential input calibration function 1400 calculates the differential voltage 1408 and the differential voltage is generated by the main circuit 1410. The module circuit gain is then adjusted until the differential voltage is equal to a known reference voltage 1412. If the gain control can be adjusted so that the differential voltage equals the reference voltage 1414, the hardware is considered to be properly calibrated. Otherwise, the user is notified of the hardware calibration failure 1416 and other appropriate actions can be taken, such as terminating the monitoring process. The differential input calibration function 1400 is repeated to verify the proper operation of each attached module using differential inputs.

Figure 15:
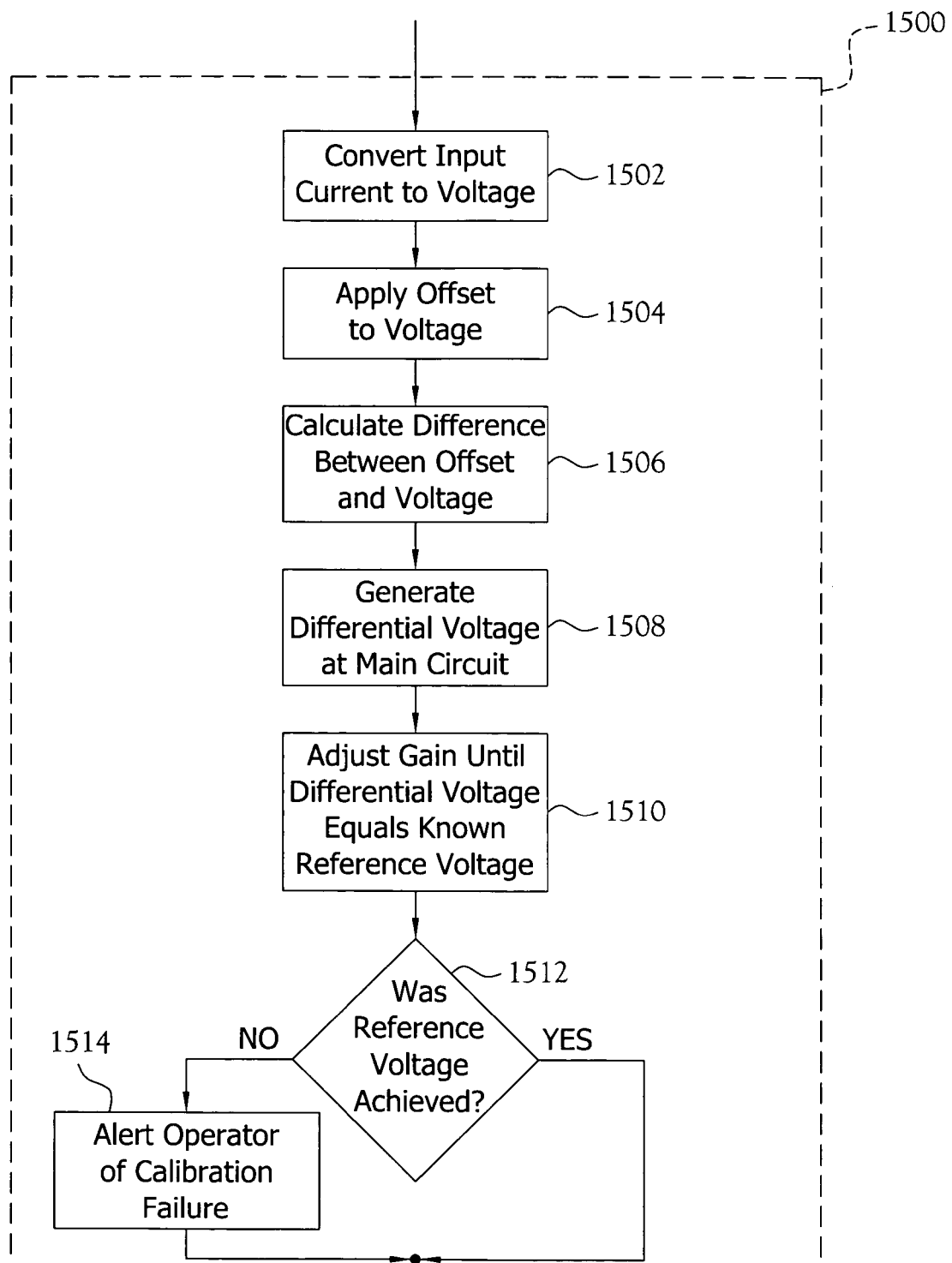
FIG. 15 is a flow chart of the calibration function for the 4-20 milliamp inputs of the flexible process optimizer.

FIG. 15 charts the flow of the 4-20 milliamp current input calibration function 1500, which is a sub-function of the calibration function 808 in greater detail. The 4-20 milliamp current input calibration function 1500 reads an input current and converts the input current into a voltage 1502 and an offset equivalent to the minimum sensor voltage is applied to null it 1504. Next, the 4-20 milliamp current input calibration function 1500 calculates the difference 1506 between the offset and the voltage and a differential voltage is generated by the main circuit 1508. The module circuit gain is then adjusted until the differential voltage is equal to a known reference voltage 1510. If the gain control can be adjusted so that the differential voltage equals the reference voltage 1512, the hardware is considered to be properly calibrated. Otherwise, the user is notified of the hardware calibration failure 1514 and other appropriate actions can be taken, such as terminating the monitoring process. The 4-20 milliamp current input calibration function 1500 is repeated to verify the proper operation of each attached module using 4-20 milliamp current inputs.

Figure 18:
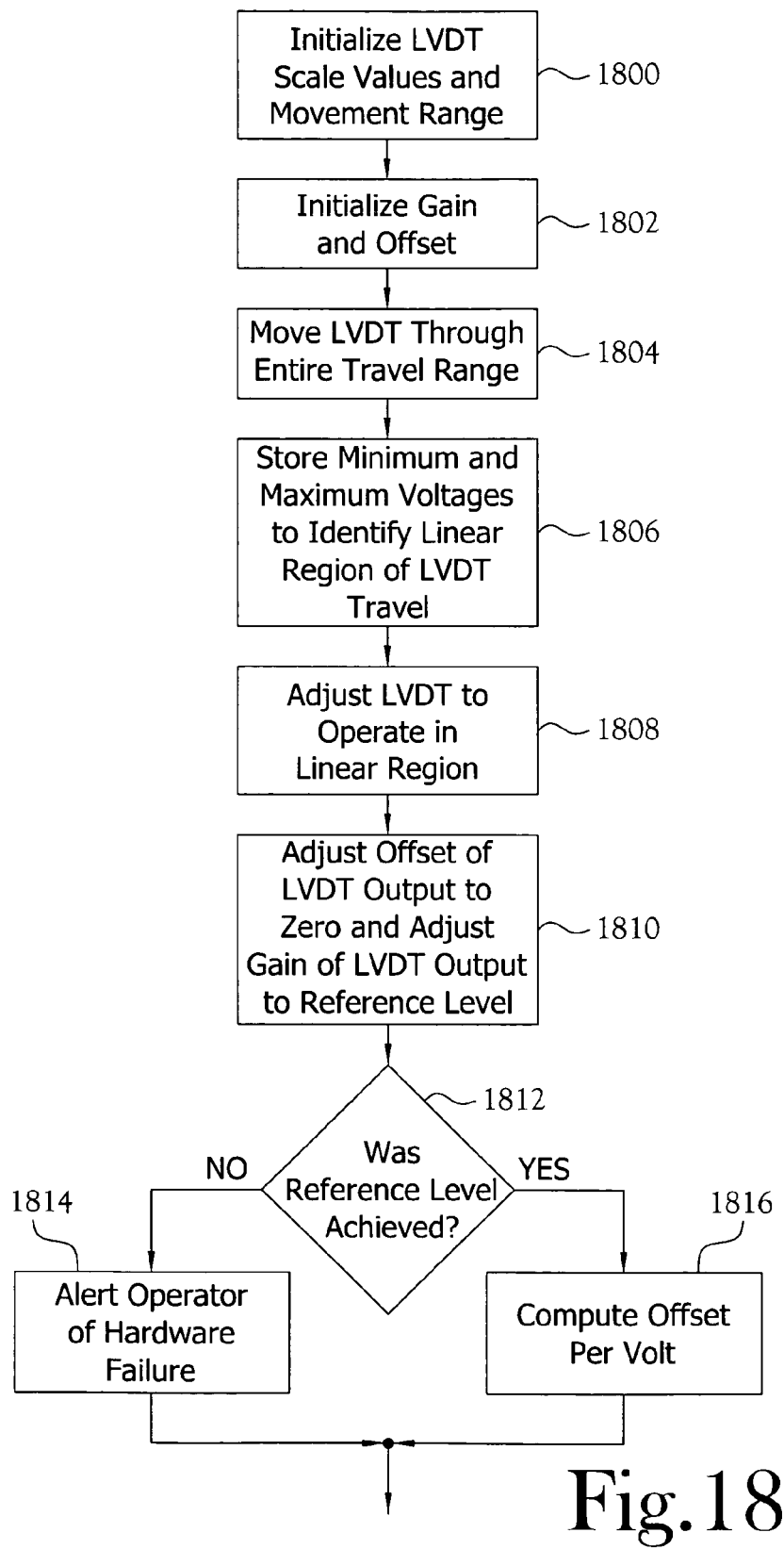
FIG. 18 is a flow diagram of the calibration function for an linear variable differential transformer input.

Of all the inputs, the LVDT input is the most difficult to configure. The system software of the flexible process optimizer 100 greatly simplifies the LVDT configuration and calibration. FIG. 18 charts the flow of the LVDT input calibration function. First, the calibration routine is initialized. This involves user entry scale information including the maximum scale, which is the maximum value of the LVDT travel in units of length, and the calibrated full scale, which is the maximum value of the LVDT travel in units of voltage 1800. The flexible process optimizer 100 then sets the gain to unity and the offset to zero 1802. A prompt from the flexible process optimizer 100 requires the user to move the LVDT through the entire range of travel of the plunger 1804. The system software records the minimum voltage and the maximum voltage produced by the LVDT and quickly analyzes the voltage data to identify the linear region of the LVDT 1806. Another prompt from the flexible process optimizer 100 requires the user to position the resting point of the LDVT within the linear region 1808. With the LDVT operating within the linear region, the offset and the gain are optimized for the LDVT input 1810. This involves adjusting the offset so the value of the LDVT output appears to be zero at the resting point. The gain is adjusted so that the LDVT output is a known reference value when the LDVT is moved to the maximum travel extent. If the gain control can be adjusted so that the LDVT output voltage equals the reference voltage 1812 at the maximum travel extent, the LDVT hardware is considered to be properly calibrated. Otherwise, the user is notified of the hardware calibration failure 1814 and other appropriate actions can be taken, such as terminating the monitoring process.

The flexible process optimizer 100 provides the user the ability to observe the results of a particular production process setup. From the output of the flexible process optimizer 100, the user can determine the changes necessary to improve the efficiency of the production process. The user then makes the changes to certain specific machine, gage and system control settings through the controller of the production machine. The flexible process optimizer 100 allows the user to immediately verify that the changes produced the desired result. The best process improvement strategy is determined by the user based upon the process sensor data and the product quality data available through the flexible process optimizer 100, which the user selects based upon criteria of importance to the user for the specific production process being monitored. Referring again to the example of a grinding system, such conditions may include the sharpness of a grinding wheel, incoming stock amount variations on the component, and any weaknesses in the machine components due to wear. These conditions are not easily accounted for in conventional control systems; however, through the flexible process optimizer 100 of the present invention, the user is provided the ability to both see and deal with these and other conditions.

Figure 16:
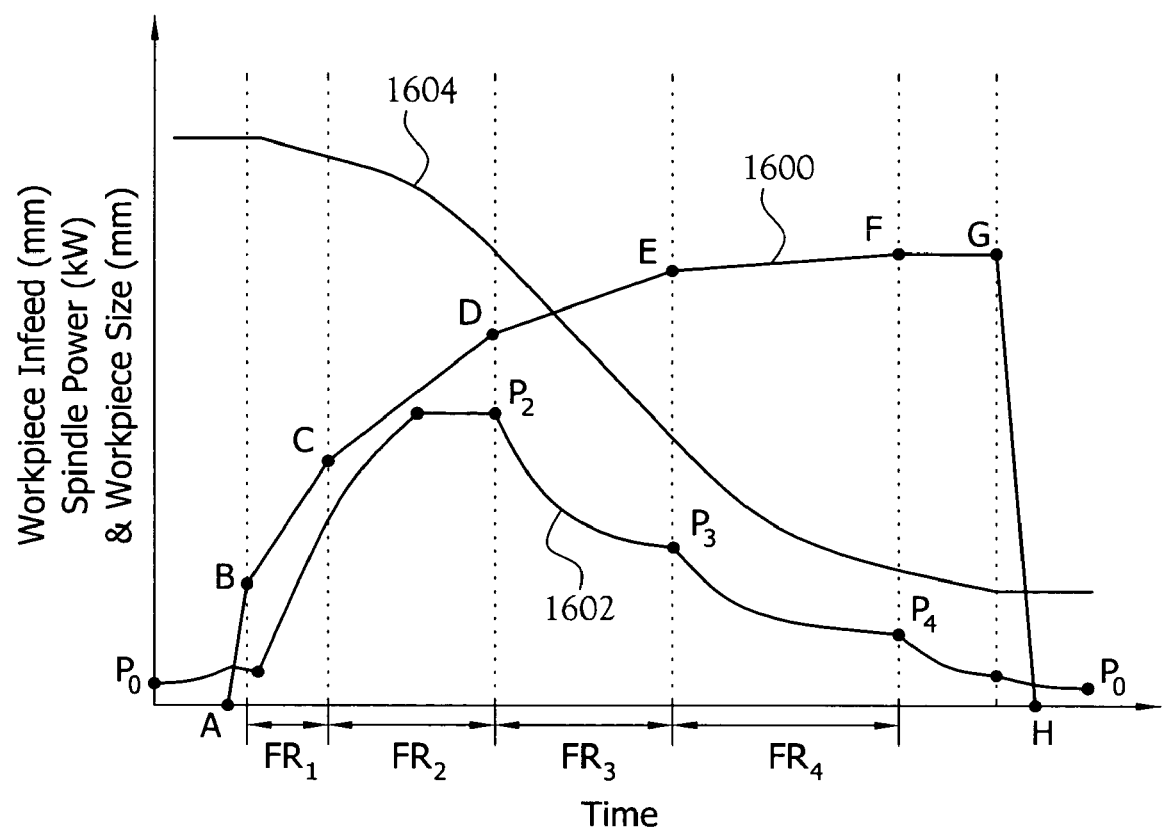
FIG. 16 illustrates a graph of infeed, part size, and power for one cycle of a production grinding process.

One example of process improvement or optimization in a production grinding system for precision component manufacturing is discussed in some detail. However, those skilled in the art will recognize that the flexible process optimizer 100 allows a similar approach to be applied to any discrete component manufacturing or continuous process industry operation. Referring to the grinding process cycle data of FIG. 16 shows the wheel-workpiece infeed 1600 having four feed rates FR1, FR2, FR3, FR4 for a grinding wheel feeding into a part being ground. The change points B, C, D, E, F, G represent the times within the production cycle at which the feed rate is adjusted. The total infeed travel distance is the difference between the grinding wheel position when contact is first made with the workpiece B and the grinding wheel position at the beginning of the spark-out period F. To one skilled in the art, the production cycle can be visualized by looking at the infeed curve 1600. The movement between change points A and B represents the rapid approach feed rate, before actual grinding takes place. The first feed rate FR1 (change points B to C) represents the rough (fast) grinding feed rate. The second feed rate FR2 (change points C to D)

represents the medium grinding feed rate. The third feed rate FR3 (change points D to E) represents the fine grinding feed rate. The fourth feed rate FR4 (change points E to F) represents the finish grinding feed rate. There is no further infeed during the spark-out period between change points F and G. Retraction of the grinding wheel occurs between change points G and H.

On the time axis, the time between start of the infeed A and the end of the wheel retraction H represents the total duration of the active grinding cycle when the wheel and workpiece are programmed to engage with each other. The total duration does not include other components of a complete production cycle such as part unload and load, any indexing of wheel or workpiece required to position them correctly for grinding, wheel dressing in production or other similar operation when the wheel is not actually in contact with the part, or waiting for the completion of other operations. Setting the machine and controlling the operation typically involves setting the feed rates $FR_1$, $FR_2$, $FR_3$, $FR_4$ and all the change points B, C, D, E, F, G from the rapid advance of wheel to its retraction after grinding has taken place. FIG. 16 also shows the power consumption of the grinding wheel spindle 1602, which is obtained from a power sensor, and the instantaneous size of the workpiece 1604 during these various grinding feed rates, which is obtained from a an in-process gage head positioned on the workpiece during the grinding cycle.

The flexible process optimizer 100 displays a continuous stream of grinding cycles as successive components are ground in production allowing the user to see not only the features of any single grinding cycle but also spot any cycle-to-cycle variations in the important features such as feed rates or change points, the power levels at different feed rates, and the pattern of the size generation curve from the in-process gage data. The flexible process optimizer 100 thus gives the user the ability to monitor multiple production process parameters and to make changes to optimize the cycle pattern and the consistency of the cycle pattern from workpiece to workpiece.

The system software offers many functions and features which allow a user the flexibility need to analyze and optimize a production process. These features generally relate to the configurability and usability of the flexible process optimizer 100, which allows the user to focus on analyzing the process, and to the capabilities that enhance the performance and value of the flexible process optimizer 100 to the user. Such features include the ability to compute values for certain parameters during live data acquisition or reviewing previously saved data, providing the user with useful information not generally available when attempting to improve a process.

One feature is an user selectable pause during data acquisition. The inclusion of a pause during data acquisition conserves memory, reduces data file sizes, and provides the user with flexibility during the acquisition operation. The occurrence and duration of a data acquisition pause is visible to the user on any data screen window during both live data acquisition and recall. Multiple data acquisition pauses are possible on any data screen.

The data display screens used to visually analyze the production process are designed to present a panoramic view of the data. When used with a long time base, the extended viewing area allows the user to view data for both the current and previous process cycles for ready comparison.

The data screens grant the user virtually unlimited control of the visual display. The user is free to change the input data scales, hide data for any input, change the color of the data plot lines in the data window, apply offsets of user selected amounts to position any input data anywhere on the data screen, invert any input data, and apply filters to eliminate unwanted frequencies or harmonics in the data being viewed.

The system software allows the user to obtain the instantaneous value of certain useful parameters at any point during the data acquisition process. Some of the available instantaneous values include the slope of the data, the average value of the data, the "area" under the curve over a certain time period, and the maximum or minimum values of the data, and the relative value of the data in relation to an user-defined reference. All instantaneous values are tabulated with time and can be saved, if desired. In addition, the system software can automatically compute the instantaneous values at user selected intervals.

The system software offers the user the ability to create an overlay from data obtained during the current data acquisition or from previously saved data. The data used to create the overlay can be unadjusted, expanded, or compressed as desired by the user. A saved overlay can be used as a background during data acquisition or superimposed on recalled data for comparison and qualitative analysis purpose. The visual presentation of the overlay is adjustable giving the user the flexibility to change the data plot colors, apply offsets to reposition the data and change the full scale range of the data in the overlay.

Recognizing the importance of documentation in any monitored process, the system software has the ability to capture any screen of data during data acquisition and data recall. In each case, the user can adjust the visual presentation of data, capture the screen image, and store the screen image in common graphical file formats such as JPEG or TIFF.

During process monitoring, large amounts of data are commonly acquired. However, not all of the data is useful in evaluating the process efficiency. The system software offers the user the flexibility to save only the portion of the data acquired that is of interest instead of forcing the storage of all acquired data. Each data screen is identified by a unique screen number and the user can enter the range of screen numbers to be saved. Alternatively, the user can bring up cursors on any acquired data screens to identify the specific data to be saved The system software includes the capability to track gradual shifts (i.e., drift) in data resulting from slowly changing conditions such as tool wear and thermal expansion or contraction of machine members over time. Similarly, the system software is capable of detecting abrupt changes in the scale and/or the offset of the data, which is useful for identifying instantaneous events such as intentional size compensation steps or random machine slide mispositioning because of stick-slip. The accumulated total of such offsets due to gradual or abrupt discrete step changes over an user-defined period is readily available to the user for review.

The user's ability to extract derivative data files is another function of the system software. The user has the ability to recall any target process previously saved data file, and identify a section of the data of real interest, and save that as a new derivative data file retaining the full functionality of any saved data file.

The system software also allows the user to select certain sensor inputs of special interest and view them in a separate window with an user-defined visual presentation, e.g., the user can choose the plot colors, the offsets, and the scales for the selected inputs. The user may also select to show or hide any input in the separate window.

Through the system software, the flexible process optimizer 100 can be configured to enable or disable inputs as desired from the available module circuits. The visual presentation of input data is customizable allowing the user to enter data identification labels and other pertinent information, including the user's notes and comments, for the various inputs. The user can enter the desired full-scale range for any sensor input within the sensor's capability. The customization and configuration information is saved in the data file and can be edited as necessary.

The flexible process optimizer 100 has the ability to monitor vibration data simultaneously as it monitors process data. Vibration data is relatively fast compared to the main process data. The vibration data typically occurs at frequencies around a few kilohertz and is usually collected over a short time period often no more than a fraction of a second. By way of comparison, the process cycle in a typical discrete component production lasts several seconds or even minutes and, therefore, requires relatively slower data acquisition speeds. The system software recognizes the fact that the need to capture vibration in machine spindles, slides, and other components may change or may be of special interest during certain phases of a process cycle. Accordingly, the system software allows the user to capture vibration data either on demand or continuously along with the slow process data. The two data types are saved in separate data files or combined in a single data file at the user's discretion. The information about when the vibration data was acquired in a process cycle is also saved in the data file.

As previously discussed, the system software allows the flexible process optimizer 100 to be customized for most specific applications by facilitating the plotting of computed process parameters specific to a particular production process. The ability to plot multiple parameters is often needed for a thorough engineering analysis of the process and the production system capabilities and limitations and enables the user to readily visualize the effects of machine setup and process changes, which is vital for process improvement or optimization of any existing operation.

In the example of a production grinding system, the computed process parameters include cycle time analysis, cycle-to-cycle consistency, and wheel hungriness. The cycle time analysis function performs a detailed breakdown of the times used on the individual components of a complete process cycle. A process cycle typically consists of various stages and components, which relate with the events taking place during these stages. Example may include a slide moving in rapidly to approach a part ready to be ground at the grinding cycle or the final disengagement of the grinding wheel from the ground work piece at the end of the cycle. Through the cycle time analysis function, the operator can evaluate the overall production efficiency and determine the percentage of the total cycle time spent in each stage of the cycle. By comparing the cycle time analysis data from one operation with other similar operations, the user has the ability to evaluate and troubleshoot the production system. In addition, the user has a useful tool to evaluate the consistency of cycle times from piece to piece.

In addition to the consistency in the various cycle times, the system software provides a tool to check for variations in the behavior of the production system through the cycle-to-cycle consistency function. The behavioral variations include variations in stock on incoming parts, misfeeding of feed slides on the machine, improper settings on a size control gage, and changes in the ability of the wheel to remove material from a part. Such variations appear as distinct features or changes in the shapes of the data curves for different sensors during a process cycle. The cycle-to-cycle consistency analysis performs a quantitative analysis of a number of key parameters that are relevant to a particular process cycle. With respect to the example of the grinding system, the relevant parameters include: the spark-out time, the total cycle time, the spark-out power, the maximum grinding power, the total area under the curve, the apparent (total) stock removal, and the slope of the infeed curves.

The flexibility inherent in the flexible process optimizer 100 also allows the system software to compute and save special parameters that determine, and may limit, the system performance, that continuously change over time, and that may not be easy to control in real time. Returning to the example of the production grinding process, one such special parameter is the grinding wheel hungriness, which represents the ability of the grinding wheel to remove material from a workpiece. Grinding wheel hungriness continually changes based upon the length of service of the grinding wheel since installation of the wheel or dressing of the grinding and the relative hardnesses of the grinding wheel and the workpiece being ground.

Figure 17:
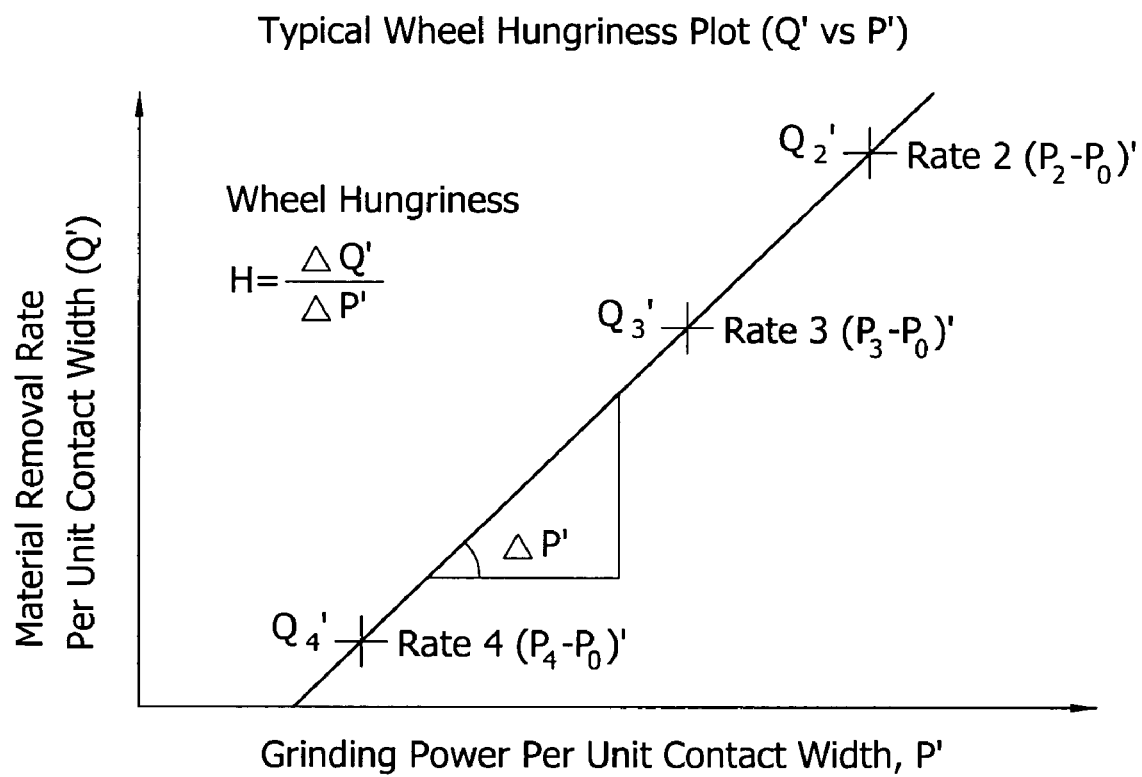
FIG. 17 illustrates a graph of the wheel hungriness parameter.

The grinding wheel hungriness function derives present hungriness value of the grinding wheel from power consumption data obtained from a power sensor input and the feed rate data or the slide position slope data. FIG. 17 illustrates a typical graph of grinding wheel hungriness charting the material removal rate per unit width versus power per unit width for the cycle data of FIG. 16. Points $P_2$, $P_3$, and $P_4$ represent the steady state power values during the feed rates $FR_2$, $FR_3$, and $FR_4$ in FIG. 16 and $P_0$ is the idle power at the beginning and the end of the cycle. The plot is typically linear and the slope of this line, which represents the volumetric material removal rate per kilowatt of grinding power, is referred to as the grinding wheel hungriness (H). As the wheel engages in grinding each workpiece, it gradually dulls and the loss of sharpness is reflected in the computed hungriness parameter. Tracking the hungriness of the grinding wheel provides a user a quantitative criteria for determining key cycle setup parameters including how and when a wheel needs resharpening through dressing.

It should be emphasized that, although a production precision grinding system is used for illustrating this invention, the flexible process optimizer 100 is applicable to a vast majority of manufacturing operations in numerous industries. In addition to discrete component manufacturing like production grinding, other industries benefiting from the flexible process optimizer 100 of the present invention include paper and pulp manufacturing, food and pharmaceuticals processing, petrochemical processing, and many others. The user's ability to adapt the process optimization strategy based on visual display and some quantitative analysis of real time process sensor data that reflects the system behavior under the production conditions in use, permits optimization for both productivity and product quality in a balanced manner with instant feed back to confirm that the desired control is actually being achieved. The actual changes made to optimize the process can be made easily on the machine's CNC system settings or other manual adjustments normally possible on the machine.

From the foregoing description, it will be recognized by those skilled in the art that a device and method for monitoring a production machine that allows data display and analysis to develop and execute an immediate flexible process optimization methodology that is verifiable on the display of the flexible process optimizer. The flexible process optimizer allows the user to change the process control strategy based on the observed actual behavior of the production system as revealed by sensors mounted on the machine for this purpose.

While the present invention has been illustrated by description of several embodiments and while the illustrative embodiments have been described in detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A method of monitoring characteristics of one or more grinding tools used in a production grinding process, the method comprising the steps of:
   (a) acquiring sensor data indicative of a rate of material removal over one or more measurement periods during the grinding process;
   (b) acquiring sensor data indicative of power consumed by the one or more grinding tools over the one or more measurement periods during the grinding process; and
   (c) calculating a ratio of the change in the rate of material removal to that of the power consumed by the one or more grinding tools over the one or more measurement periods.

2. The method of claim 1 further comprising the steps of:
   (d) calculating one or more hungriness values for the one or more grinding tools as defined by a slope of a relationship between the rate of material removal and the power consumed by the one or more grinding tools over the one or more measurement periods; and
   (e) plotting the one or more hungriness values versus time on a display device.

3. The method of claim 2 further comprising:
   step (e) including generating multiple plots of hungriness values for multiple grinding tools; and
   (f) comparing the multiple plots to determine which of the multiple grinding tools is best capable of performing the production grinding process.

4. The method of claim 1 wherein step (a) further comprises acquiring sensor data indicative of positions of the grinding tool relative to the part during multiple consecutive grinding operations.

5. The method of claim 4 further comprising:
   (d) comparing the relative positions of the grinding tool and the part during the multiple consecutive grinding operations; and
   (e) determining based on step (d) whether the grinding tool is too worn to proceed with the production grinding process.

6. The method of claim 1 further comprising the step of plotting on a display device the rate of material removal versus the power consumed by the one or more grinding tools.

7. A method for optimizing a production process for grinding a workpiece using a grinding tool during one or more grinding cycles, the method comprising:
   (a) moving the grinding tool toward the workpiece during an approach period which begins a grinding cycle;
   (b) contacting the grinding tool to the workpiece at a contact time;
   (c) feeding the grinding tool to the workpiece at a feed rate during multiple consecutive feed periods, each feed period bounded by feed transition points at which the feed rate is changed;
   (d) retracting the grinding tool from the workpiece at a retraction time which ends the grinding cycle;
   (e) collecting power data during the grinding cycle, the power data indicative of power applied to the grinding tool;
   (f) collecting infeed position data during the grinding cycle, the infeed position data indicative of a position of the grinding tool relative to a position of the workpiece;
   (g) displaying the power data versus time for the grinding cycle;
   (h) displaying the infeed position data versus time for the grinding cycle;
   (i) determining a time duration of the grinding cycle;
   (j) observing the power data to determine whether the power data reaches a steady state near the feed transition points;
   (k) observing the power data to determine a first contact point at which the grinding tool makes first contact with the workpiece during the grinding cycle;
   (l) observing the power data to estimate time durations to reach steady state during one or more of the consecutive feed periods;
   (m) observing the slope of the position data for one or more of the consecutive feed periods;
   (n) repeat steps (a) through (m) through multiple grinding cycles for multiple workpieces; and
   (o) review the power and position data plotted for the multiple workpieces of step (n) to identify variations in the power and position data from workpiece to workpiece, where the variations include variations in duration of the consecutive feed periods, variations in maximum power reached during the multiple grinding cycles, and variations in power reached at the end times of the multiple grinding cycles.

8. The method of claim 7 further comprising optimizing the production process by minimizing the approach period of step (a).

9. The method of claim 7 further comprising optimizing the production process by minimizing the total time duration of the grinding cycle.

10. The method of claim 7 further comprising optimizing the production process by adjusting the feed rate during one or more of the consecutive feed periods of step (c).

11. The method of claim 7 further comprising optimizing the production process by adjusting the feed rate during one or more of the consecutive feed periods of step (c) to ensure that steady states in the power data occur during one or more of the consecutive feed periods.

12. The method of claim 7 further comprising optimizing the production process by increasing the time duration of one or more of the consecutive feed periods and decreasing the time duration of one or more of the consecutive feed periods.

13. The method of claim 7 further comprising:
   (p) collecting workpiece size data during the grinding cycle, the workpiece size data indicative of the size of the workpiece during the grinding cycle;
   (q) plotting the workpiece size data versus time for the grinding cycle;
   (r) observing the workpiece size data to determine variations in piece-to-piece part size for multiple workpieces;
   (s) optimizing the production process to achieve improved consistency in piece-to-piece part size by performing one or more optimization steps comprising:
      (s1) adjusting the feed rate during one or more of the consecutive feed periods,
      (s2) adjusting relative locations of the feed transition points during one or more of the feed periods,
      (s3) adjusting the time duration of the consecutive feed period occurring just prior to the retraction time, and
      (s4) minimizing overall cycle time of the grinding cycle.

14. The method of claim 13 wherein step (s) further comprises adjusting the feed rate during one or more of the consecutive feed periods to ensure that steady states in the power data occur during one or more of the consecutive feed periods.

15. The method of claim 7 further comprising performing the following steps when it is determined in step (j) that the power data reaches a steady state near the feed transition points:
(p) computing hungriness data for the grinding tool for one or more of the grinding cycles; and
(q) computing grinding energy expended during one or more of the grinding cycles.

16. The method of claim 7 further comprising computing grinding energy expended during a grinding cycle.

17. The method of claim 7 further comprising the following steps to determine an optimum process for dressing the grinding tool:
(p) acquiring sensor data indicative of a rate of material removal during a first grinding cycle using a grinding tool prepared according to a first dressing process;
(q) acquiring sensor data indicative of power consumed by the grinding tool during the first grinding cycle using the grinding tool prepared according to the first dressing process;
(r) calculating a first hungriness value for the grinding tool prepared according to the first dressing process, the first hungriness value defined by a slope of a relationship between the rate of material removal and the power consumed by the grinding tool during first grinding cycle;
(s) acquiring sensor data indicative of a rate of material removal during a second grinding cycle using a grinding tool prepared according to a second dressing process that is different from the first dressing process;
(t) acquiring sensor data indicative of power consumed by the grinding tool during the second grinding cycle using the grinding tool prepared according to the second dressing process;
(u) calculating a second hungriness value for the grinding tool prepared according to the second dressing process, the hungriness value defined by a slope of a relationship between the rate of material removal and the power consumed by the grinding tool during the second grinding cycle; and
(v) determining which of the first and second dressing processes is optimum for the grinding tool to be used in the production process based at least in part on a comparison of the first and second hungriness values.

18. The method of claim 17 further comprising:
(w) acquiring sensor data indicative of a first rate of wear of the grinding tool prepared according to the first dressing process;
(x) acquiring sensor data indicative of a second rate of wear of the grinding tool prepared according to the second dressing process; and
(y) determining which of the first and second dressing processes is optimum for the grinding tool to be used in the production process based at least in part on a comparison of the first and second rates of wear.

19. The method of claim 17 further comprising computing slope values of the position data for one or more of the consecutive feed periods, the computing performed in real-time during the production process or after a pause in the production process.

20. A method for monitoring a production process for grinding a workpiece using a grinding wheel spun by a grinding machine, the method comprising the steps of:
(a) providing a vibration sensor attached to the grinding machine for generating a vibration signal indicative of vibration levels of selected grinding machine elements;
(b) providing a position sensor for generating a position signal indicative of a position of the grinding wheel with respect to the workpiece;
(c) providing at least one power sensor for generating a power signal indicative of power applied to the grinding wheel;
(d) calibrating the vibration sensor, the position sensor and the power sensor;
(e) processing the vibration signal, the position signal and the power signal to generate vibration data, position data and power data,
(f) selecting time and amplitude settings for a display device to display the vibration data, position data and power data,
(g) displaying the vibration data, position data and power data simultaneously on the display device,
(h) observing the vibration data on the display device to detect excessive vibration amplitudes while grinding the workpiece, and
(i) observing the position and power data on the display device to monitor progress of the production process.

21. The method of claim 20 further comprising:
(j) providing a workpiece form sensor for generating a form signal indicative of the form of the workpiece while grinding the workpiece; and
(k) processing the form signal to generate workpiece form data; and
(l) observing the form data on the display device to monitor progress of the production process.

22. The method of claim 20 wherein step (j) further comprises providing a form sensor for generating one or more of a size signal, a roundness signal and a profile signal.

23. The method of claim 20 wherein
step (e) further comprises processing one or more of the vibration signal, the position signal, the power signal and a form signal using a Fast Fourier Transform (FFT) to generate one or more of FFT vibration data, FFT position data, FFT power data and FFT form data, and
step (g) further comprises displaying one or more of the FFT vibration data, FFT position data, FFT power data and FFT form data on the display device while grinding the workpiece.

24. The method of claim 23 wherein step (g) further comprises simultaneously displaying two or more of the FFT vibration data, FFT position data, FFT power data and FFT form data for comparative purposes on the display device after a pause in the grinding of the workpiece.

25. The method of claim 24 wherein step (g) further comprises simultaneously displaying two or more of the FFT vibration data, FFT position data, FFT power data and FFT form data in one or more data windows on the display device.

26. The method of claim 23 further comprising storing one or more of the FFT vibration data, FFT position data, FFT power data and FFT form data for future recall.

27. The method of claim 23 further comprising processing one or more of the FFT vibration data, FFT position data, FFT power data and FFT form data to extract values of one or more predominant frequencies.

28. The method of claim 20 further comprising:
(j) selecting a maximum vibration frequency of interest in the vibration signal; and performing step (h) while optimizing one or more of data sampling rate, data display rate, display time scale and total data volume based at least in part on the selected maximum vibration frequency.

29. The method of claim 20 further comprising:
(j) monitoring one or more of the vibration data, position data and power data to detect interruptions in acquisition thereof;

(k) generating an alert signal upon detection of an interruption in the acquisition of one or more of the vibration data, position data and power data; and (g) pausing processing of one or more of the vibration data, position data and power data upon detection of an interruption in the acquisition thereof.

* * * * *